United States Patent
Li et al.

(10) Patent No.: US 12,486,196 B2
(45) Date of Patent: Dec. 2, 2025

(54) METHOD FOR INDUSTRIAL PREPARATION OF NANO TUNGSTEN BRONZE OF ALKALI METAL BY HYDROLYSIS OF A COORDINATION COMPOUND OF CATION AT A LOWER TEMPERATURE

(71) Applicant: BEIHANG UNIVERSITY, Beijing (CN)

(72) Inventors: Ruixing Li, Beijing (CN); Fandong Kong, Beijing (CN)

(73) Assignee: BEIHANG UNIVERSITY, Beijing (CN)

( * ) Notice: Subject to any disclaimer, the term of this patent is extended or adjusted under 35 U.S.C. 154(b) by 0 days.

(21) Appl. No.: 18/862,060

(22) PCT Filed: Apr. 24, 2024

(86) PCT No.: PCT/CN2024/089596
§ 371 (c)(1),
(2) Date: Oct. 31, 2024

(87) PCT Pub. No.: WO2024/183831
PCT Pub. Date: Sep. 12, 2024

(65) Prior Publication Data
US 2025/0109063 A1   Apr. 3, 2025

(30) Foreign Application Priority Data
Sep. 13, 2023   (CN) .......................... 202311176355.1

(51) Int. Cl.
*C03C 17/25*   (2006.01)
*C01G 41/00*   (2006.01)
(Continued)

(52) U.S. Cl.
CPC ............ *C03C 17/25* (2013.01); *C01G 41/006* (2013.01); *C09D 7/61* (2018.01); *C09D 129/04* (2013.01);
(Continued)

(58) Field of Classification Search
CPC .............. C03C 17/25; C03C 2217/228; C03C 2217/72; C03C 2218/112; C03C 2218/32;
(Continued)

(56) References Cited

U.S. PATENT DOCUMENTS

2011/0248225 A1   10/2011   Mamak et al.

FOREIGN PATENT DOCUMENTS

| CN | 105668632 A | 6/2016 |
| CN | 106892460 A | 6/2017 |

(Continued)

OTHER PUBLICATIONS

International Search Report issued in corresponding International Application No. PCT/CN2024/089596 dated Jul. 18, 2024, pp. 1-4.

(Continued)

*Primary Examiner* — Robert S Walters, Jr.
(74) *Attorney, Agent, or Firm* — Carter, DeLuca & Farrell LLP

(57) ABSTRACT

The invention discloses a method for preparing nanometer alkali metal tungsten bronze by hydrolysis of a coordination compound of cation at a lower temperature, and the application of nanometer alkali metal tungsten bronze coating. The method adopts one-step low-temperature heating hydrolysis to synthesize nano alkali metal tungsten bronze, and the preparation process requires no special equipment, no high temperature and high pressure, mild process conditions, low energy consumption, short cycle, high productions, high yield and low cost. The synthesized products have good crystallinity, which are $Cs_xWO_3$, $Rb_xWO_3$, $K_xWO_3$, (Continued)

$Na_xWO_3$, in which $X=0.2\sim0.33$, the synthesized short rod-like alkali metal tungsten bronze particle length is 10~150 nm, the diameter is 10~50 nm, and the synthesized isometric alkali metal tungsten bronze particle size is less than 100 nm in all direction. The above powders have excellent near-infrared shielding properties and visible light transmission properties, good UV shielding performance and certain middle and far infrared shielding performance. The nanometer alkali metal tungsten bronze coating prepared by the invention is an simple and controllable preparation process, and has high near infrared shielding performance and excellent ultraviolet shielding performance.

8 Claims, 13 Drawing Sheets

(51) Int. Cl.
*C09D 7/61* (2018.01)
*C09D 129/04* (2006.01)
*B82Y 40/00* (2011.01)

(52) U.S. Cl.
CPC ........... *B82Y 40/00* (2013.01); *C01P 2002/72* (2013.01); *C01P 2002/82* (2013.01); *C01P 2002/84* (2013.01); *C01P 2004/03* (2013.01); *C03C 2217/228* (2013.01); *C03C 2217/72* (2013.01); *C03C 2218/112* (2013.01); *C03C 2218/32* (2013.01)

(58) Field of Classification Search
CPC ...... C09D 7/61; C09D 129/04; C01G 41/006; B82Y 40/00; C01P 2002/72; C01P 2002/82; C01P 2002/84; C01P 2004/03
See application file for complete search history.

(56) References Cited

FOREIGN PATENT DOCUMENTS

| | | |
|---|---|---|
| CN | 107601568 A | 1/2018 |
| CN | 107915257 A | 4/2018 |
| CN | 108946812 A | 12/2018 |
| CN | 113185871 A | 7/2021 |
| CN | 114014364 A | 2/2022 |
| CN | 117228721 A | 12/2023 |

OTHER PUBLICATIONS

Written Opinion issued in corresponding International Application No. PCT/CN2024/089596 dated Jul. 18, 2024, pp. 1-5.
Extended European Search Report issued by the European Patent Office on May 23, 2025 in corresponding EP Patent Application No. 24766545.8.
Mann, M. et al., "Synthesis of tungsten bronze powder and determination of its composition" Journal of Material Science (Feb. 2007) pp. 1010-1018, vol. 42, No. 3.
Zhang, Y. et al., "Hydrothermal synthesis of Cs0.3WO3 with uniform morphology and size via a dynamic balance of pH" Chemical Physics (Sep. 2022) pp. 1-9, vol. 564.

METHOD FOR INDUSTRIAL PREPARATION OF NANO TUNGSTEN BRONZE OF ALKALI METAL BY HYDROLYSIS OF A COORDINATION COMPOUND OF CATION AT A LOWER TEMPERATURE

TECHNICAL FIELD

The invention relates to an alkali metal tungsten bronze nanomaterial, in particular to a method for industrializing the preparation of nano alkali metal tungsten bronze by hydrolysis of a coordination compound of cation at a lower temperature, and the application of the obtained nano alkali metal tungsten bronze on the decorative curtain wall of buildings to achieve thermal insulation and cooling performance.

BACKGROUND TECHNIQUE

Alkali metal tungsten bronze is a typical non-stoichiometric compound, its chemical formula is $M_xWO_3$ ($0 \leq X \leq 0.33$). Due to its special one-dimensional tunnel structure marked by six-member rings and mixed valence W ions, it has many excellent physical and chemical properties, such as photothermal conversion, selective light absorption, near infrared shielding, etc. It has broad application prospects in energy, military, construction, medical and other fields.

With the wide application of alkali metal tungsten bronze nanomaterials, its preparation technology is becoming more and more important. At present, the preparation of alkali metal tungsten bronze powder mainly includes:

Solid phase method, the solid phase method is usually the metal elemental, oxide or salt and tungsten and tungsten oxide mixed, in high temperature, pressure or ball milling and other conditions, through the solid phase reaction, to obtain different types of alkali metal tungsten bronze. However, it is difficult to control the morphology of alkali metal tungsten bronze synthesized by this method, and the particle size of the product is large.

Wet chemical method, wet chemical method mainly includes: solvothermal method and hydrothermal method. The synthesis condition of wet chemical method is mild, the operation is simple, and the size and morphology of the product are relatively controllable. The alkali tungsten bronze nanoparticles prepared by wet chemical method have narrow particle size distribution, light agglomeration degree, and do not need to be annealed at high temperature under reducing atmosphere. However, the concentration of reactants is low, and the reaction temperature and pressure are high, the synthesis process requires special equipment (reactor), the reaction has a certain risk, the reaction time is long, the single yield is very low, and it is not easy to industrial production.

In addition, the high-temperature reduction method requires hydrogen to be used in the process of high temperature heating (800° C.), which has complicated preparation process, low utilization rate of raw materials, and certain risk (H. Takeda, K. Adachi, J. M. Coamic Soc., 2007, 90 (12), 4059-4061). Solvothermal or hydrothermal reactions also require a higher reaction temperature (usually more than 200° C.) and a longer preparation time, which takes more than ten hours or even several days (C. uo, S. Yin, M. Yan, T. Ato, J. Ater. Chem., 2011, 21 (13), 5099).

Architectural decorative curtain wall is a lightweight wall commonly used in modern large and high-rise buildings with decorative effects. Due to the limitations of materials and processing technology, the curtain wall cannot meet the requirements of thermal physical factors (thermal radiation, condensation) and sound insulation, fire prevention, etc., and has not been well developed and promoted. Nowadays, due to the combination of curtain wall technology and technology, in response to the call of global energy conservation and emission reduction, intelligent curtain walls, such as glass curtain walls, solar photovoltaic curtain walls, ventilation tunnel breathing curtain walls, intelligent curtain walls sensing wind and rain, will show the unique charm of the building.

In order to realize the energy saving and emission reduction of the coating materials on the building decorative curtain wall, it is urgently necessary to provide an industrial processing method for the large-scale preparation of alkali metal tungsten n bronze materials at low temperature.

CONTENT OF INVENTION

One of the purposes of the invention is to provide a method for industrializing the preparation of nano alkali metal tungsten bronze by hydrolysis of a coordination compound of cation at a lower temperature. Due to the short reaction time and low reaction temperature (40° C.~95° C.) in the hydrolysis process, the preparation method realizes the industrial production of alkali metal tungsten bronze nanomaterials at low cost. The method of the invention applies one-step low-temperature heating hydrolysis to synthesize nano alkali metal tungsten bronze, which are $Cs_xWO_3$, $Rb_xWO_3$, $K_xWO_3$, $Na_xWO_3$, in which X=0.2 □0.33. The nano alkali metal tungsten bronze obtained by the method of the invention has a short rod-like and equiaxial structure, the synthesized short rod-like alkali metal tungsten bronze nanoparticles have a length of 10~150 nm and a diameter of 10~50 nm, and the synthesized alkali metal tungsten bronze nanoparticles with an equiaxial structure are less than 100 nm in each direction, and the above products have good crystallinity. It has excellent visible light transmission, near infrared shielding performance, and better ultraviolet shielding and certain middle and far infrared shielding performance. By precisely regulating the coordination between the hydrolyzed product of the tungsten source of the reaction system and the alkali metal element, the invention reacts in the liquid phase below the boiling point of the solvent, so as to obtain the alkali metal tungsten bronze nano-powder under the condition of low temperature and no high pressure. The crystallization rate can be controlled by precisely controlling the stirring speed, reaction time and temperature of the reaction system, so as to control the particle size of alkali metal tungsten bronze. The tungsten source, alkali metal source, deionized water and alcohol solution adopted in the invention are environment-friendly reagents and have low cost. The reaction system adopted by the method of the invention has low temperature, no high pressure, uniform product morphology, short preparation cycle, low energy consumption, no need for special equipment, high yield and large yield.

The second purpose of the invention is to provide an industrial spraying alkali metal tungsten bronze coating on a glass surface to obtain a large-scale, low-cost production of glass curtain wall. The coating preparation method of the invention does not require special equipment, has simple technological process and short preparation period. The coating prepared by the invention has excellent near-infrared shielding performance, high visible light transmittance, good UV shielding performance and excellent heat insulation performance.

The invention relates to a method for industrializing preparation of nano alkali metal tungsten bronze by brine hydrolysis of low temperature cationic coordination tungsten, which comprises the following steps:

Step 1. Prepare the alkali metal source solution;
Step 11. Add deionized water to the first mixing container;
Step 12. Add the alkali metal source to the first mixing container;
Step 13. Under normal pressure, set the dissolution temperature to 10° C.~40° C. and stirring speed to 200 r/min~600 r/min. The alkali metal source solution was prepared after stirring for 1 min~15 min.
Step 2. Prepare tungsten source solution;
Step 21. Add the tungsten source to the second mixing container;
Step 22. Add the alcohol solution to the second stirring container;
Step 23. Under normal pressure, set the dissolution temperature to 10° C.~40° C. and stirring speed to 200 r/min~600 r/min. The tungsten solution was prepared after stirring for 10 min~60 min.
Step 3. Heat by water-bath and hydrolyze to produce nano alkali tungsten bronze dispersion;
Dosage: 0.18 kg~90 kg of alkali metal source solution and 3.68 kg~184 kg of tungsten source solution are required for the preparation of 1 kg of nanometer alkali metal tungsten bronze powder.

One-step low-temperature heating hydrolysis of alkali metal tungsten bronze dispersion: alkali metal source solution, tungsten source solution and deionized water are added to the water bath heating container (3); The water bath temperature was set to 40~95° C., the stirring speed was 200 r/min~1000 r/min, and the alkali tungsten bronze dispersion was obtained after stirring for 90 min~2880 min.

Step 4. Solid-liquid separation;
Step 5. Dry nano alkali tungsten bronze powder;
The alkali tungsten bronze liquid prepared in step four is dried by vacuum resistance furnace, the vacuum degree is $1\times10^{-2}$ Pa~$1\times10^{-4}$ Pa, the drying temperature is 50° C.~100° C., the drying time is 180 min~720 min, and the alkali tungsten bronze powder is obtained.

The invention adopts hydrolysis of a coordination compound of cation at a lower temperature to industrially prepare nano alkali metal tungsten bronze, which has the advantages of:

① The use of low-temperature hydrolysis of a coordination compound of cation industrial preparation of nano alkali metal tungsten bronze, to achieve the synthesis of pure phase alkali metal tungsten bronze under low temperature and low-pressure conditions, the process conditions are mild, and the product crystallization is good, no need for subsequent calcination, low energy consumption.

② The use of hydrolysis of a coordination compound of cation at a lower temperature industrialization to prepare nano alkali metal tungsten bronze, the type of raw material requirements is not high, alkali metal sources and solvents available variety.

③ The use of hydrolysis of a coordination compound of cation at a lower temperature industrialization to prepare nano alkali metal tungsten bronze, the industrial process is simple, the preparation period is short, no high temperature, high pressure special equipment.

④ The use of hydrolysis of a coordination compound of cation at a lower temperature industrialization to prepare nano alkali metal tungsten bronze, high yield and large output.

⑤ The use of 1 hydrolysis of a coordination compound of cation at a lower temperature industrialization to prepare nano alkali metal tungsten bronze, can control the pure phase alkali metal tungsten bronze synthesis cycle by stirring time and stirring rate, and does not affect the pure phase cesium tungsten bronze morphology.

⑥ The use of 1 hydrolysis of a coordination compound of cation at a lower temperature industrial preparation of nano alkali metal tungsten bronze, the volume of the reaction vessel, liquid phase volume and material are not sensitive, can be simply by increasing the volume of the reaction vessel or liquid phase volume control output.

⑦ The use of hydrolysis of a coordination compound of cation at a lower temperature industrial preparation of nano alkali metal tungsten bronze, the product performance is excellent.

⑧ In the spraying process, the distance between the ultrasonic atomizing nozzle array and the upper surface of the pre-coated substrate is 5~20 cm, so that the ultrasonic atomizing nozzle array can realize a short time and large area spraying in the spraying area of not less than 0.8 m×0.8 m, and then it can be cured by hot air to improve the binding force between the coating and the glass surface.

ILLUSTRATED DESCRIPTION

In FIG. 2, T represents the temperature sensor, F represents the pressure gauge, P represents the flow meter, and the valve on the channel.

CONCRETE IMPLEMENTATION MODE

The invention will be further explained in detail in combination with the attached drawings and examples below.

Figure 1:
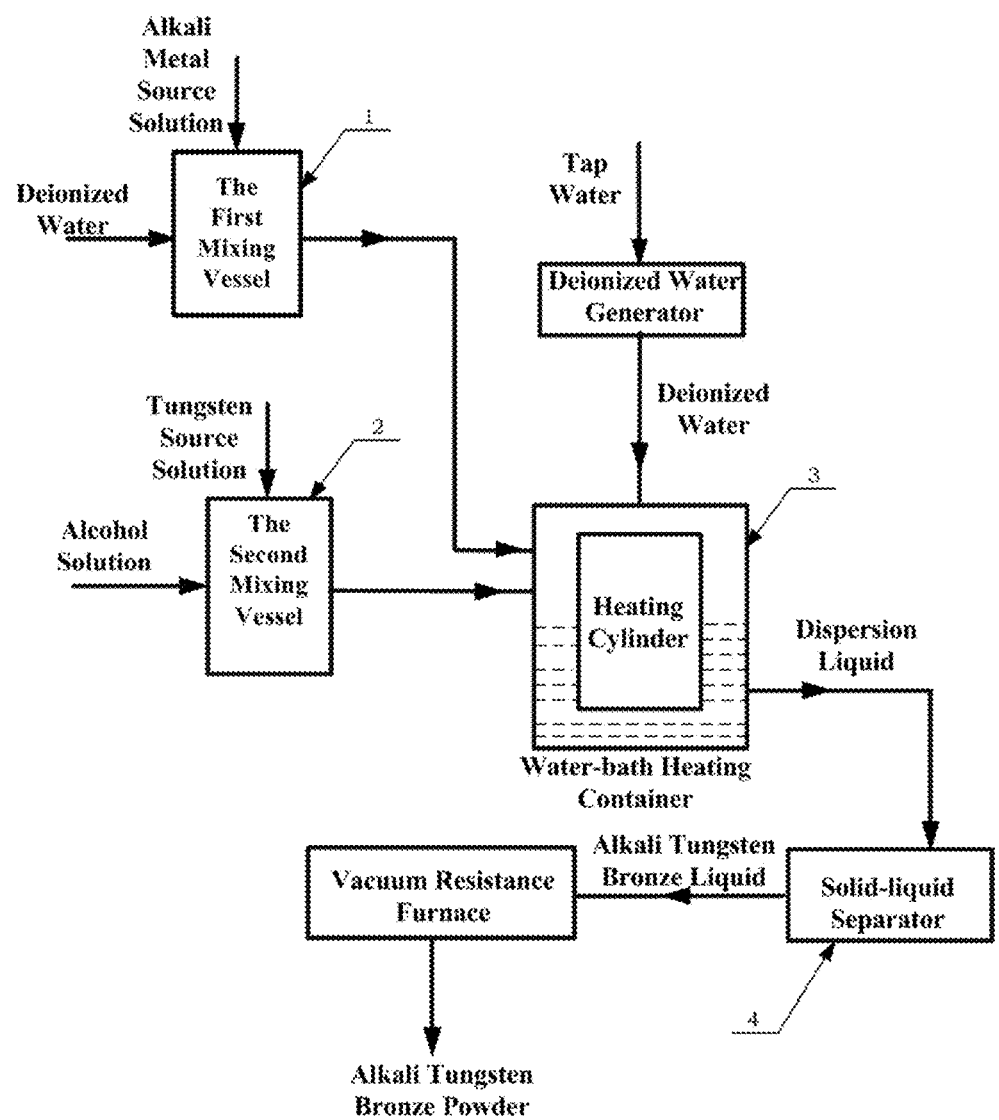
FIG. 1 is a flow chart of the method for industrializing preparation of nano alkali metal tungsten bronze by brine hydrolysis of low temperature cationic coordination tungsten.

As shown in FIG. 1, the invention provides a method for industrializing preparation of nano alkali metal tungsten bronze by hydrolysis of a coordination compound of cation at a lower temperature, which comprises the following preparation steps:

Step 1. Prepare the alkali metal source solution;
Step 11. Add deionized water to the first mixing container;
Step 12. Add the alkali metal source to the first mixing container;

In the present invention, an alkali metal source includes one or two combinations of alkali metal ions salts corresponding to hydroxides, chloride salts, and nitrate, sulfate and carbonate.

The hydroxides are cesium hydroxide, potassium hydroxide or sodium hydroxide.

The chlorine salts are cesium chloride, rubidium chloride, potassium chloride or sodium chloride.

The nitrates are cesium nitrate, potassium nitrate or sodium nitrate.

The sulfates are cesium sulfate, potassium sulfate, or sodium sulfate.

The carbonates are cesium carbonate, potassium carbonate or sodium carbonate.

Step 13. Under normal pressure, set the dissolution temperature to 10° C.~40° C. and stirring speed to 200 r/min~600 r/min. The alkali metal source solution was prepared after stirring for 1 min~15 min.

The concentration of alkali metal source in the prepared alkali metal source solution is 0.1 mol/L~6 mol/L.

Figure 3:
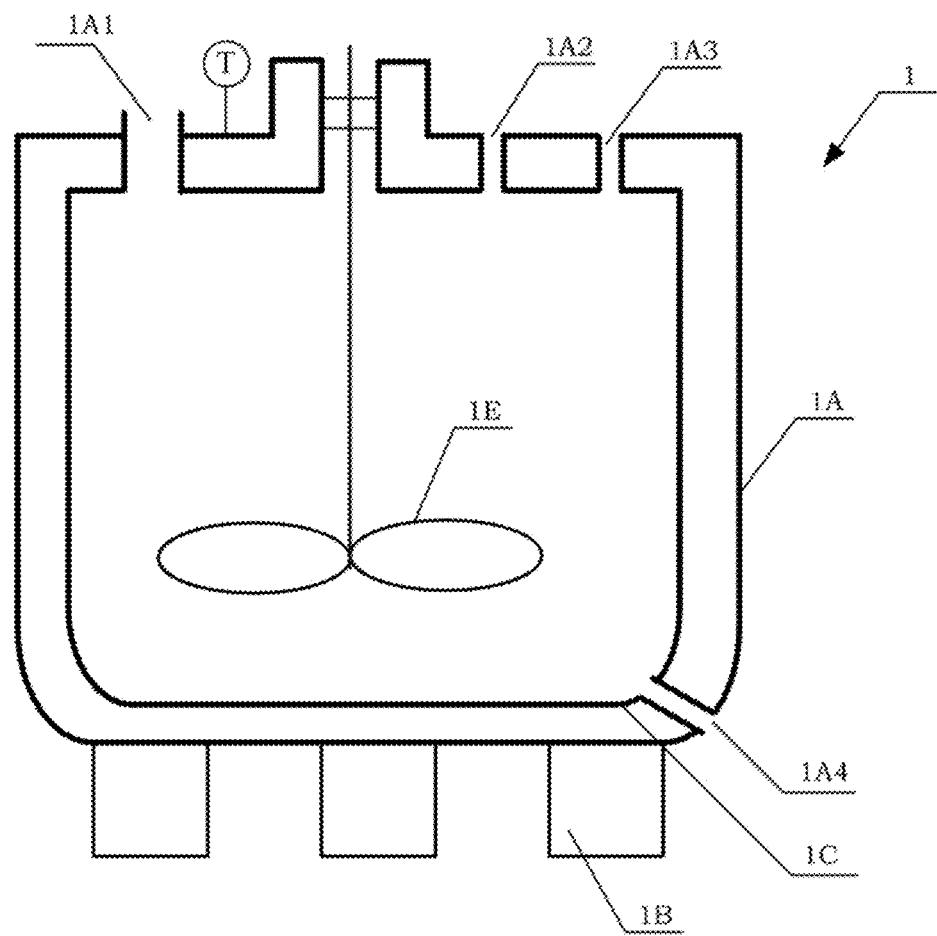
FIG. 3 is a structural section diagram of the first mixing vessel of the invention.

As shown in FIG. 3, in the present invention, the first mixing vessel 1 is a double-layer stainless steel round drum. The interior of the first mixing container 1 is provided with an agitator 1E, which is used to provide the stirring speed of the first solution in the preparation process, and the stirring speed is 200 r/min~600 r/min.

Figure 2:
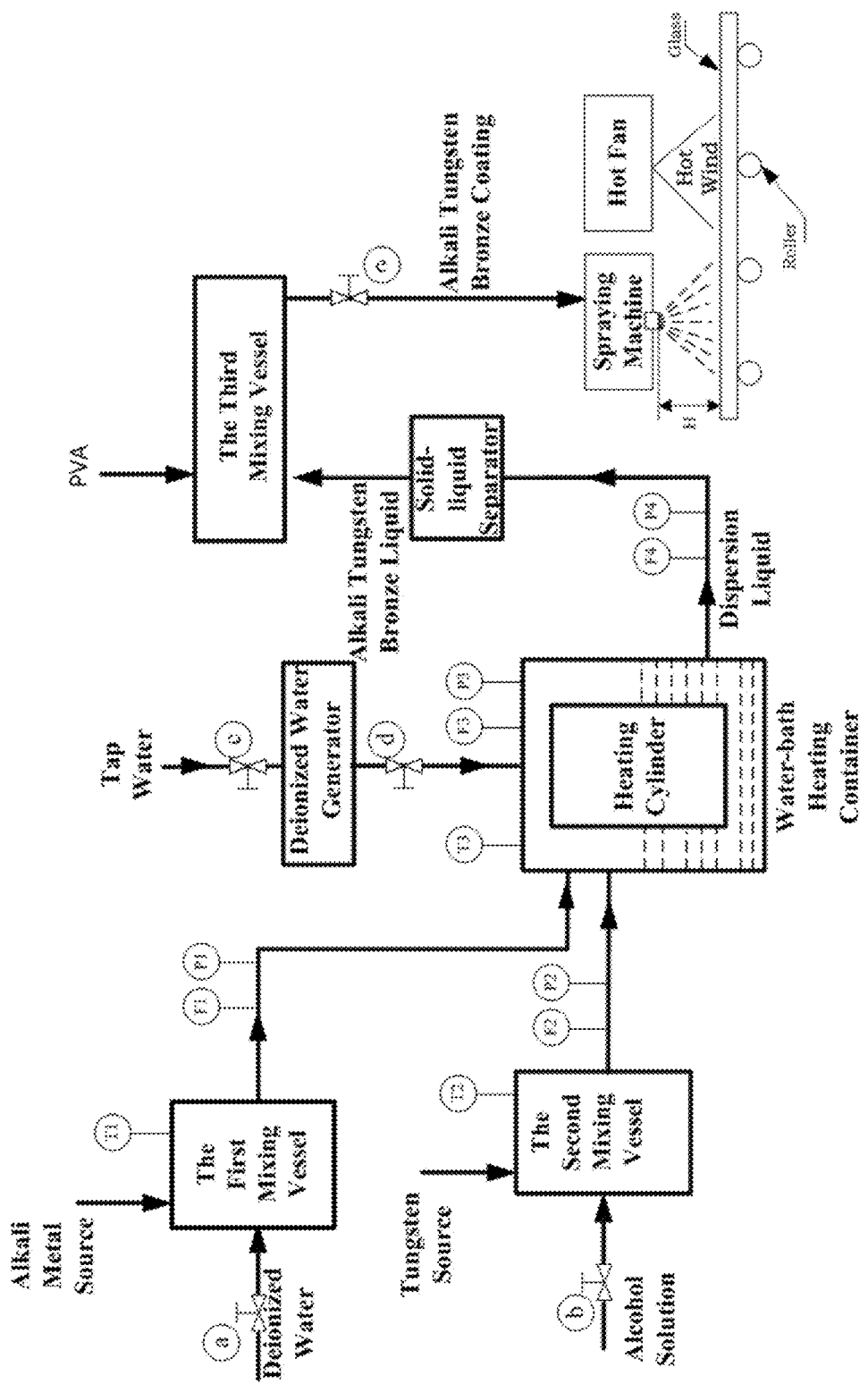
FIG. 2 is the flow chart of making glass curtain wall by using the nano-alkali tungsten bronze prepared by the low-temperature cationic coordination tungsten brine hydrolysis industrialization of the invention.

The cylinder block 1A of the first mixing vessel 1 is provided with an alkali metal source feed port 1A1, a deionized water feed port 1A2 and an exhaust port 1A3; The exhaust port 1A3 is used for discharging the gas generated in the process of preparing the alkali metal source solution to ensure the safety of the preparation process of the alkali metal source solution; The discharge port 1A4 for the alkali metal source solution is arranged under the cylinder block 1A. The discharge port 1A4 can be communicated with the water bath heating container 3 through a connected pipeline, on which a pressure gauge, flowmeter, valve, etc., can be arranged, as shown in FIG. 2.

The bottom of the first mixing container 1 is provided with a base 1B. The base 1B is used to support the mixing container on the one hand, and to keep the first mixing container 1 stable under working condition on the other hand.

In the invention, in order to monitor the temperature of the alkali metal source solution in the preparation process, a temperature sensor is provided in the first stirring vessel 1 for measuring the dissolution temperature of the alkali metal source solution in the preparation process. If the current dissolution temperature is higher than the set dissolution temperature (10° C.~40° C.), reduce the stirring speed.

Step 2. Prepare tungsten source solution;
Step 21. Add the tungsten source to the second mixing container; In the present invention, tungsten source is tungsten hexachloride (WCl6) or tungsten tetrachloride (WCl$_4$).
Step 22. Add the alcohol solution to the second stirring container; In the present invention, the alcohol solution is one, two or a combination of methanol (CH$_3$OH), ethanol (CH$_3$CH$_2$OH), n-propanol (CH$_3$(CH$_2$)$_2$OH), isopropanol (CH(CH$_3$)$_2$OH) and n-butanol (CH$_3$(CH$_2$)$_3$OH).
Step 23. Under normal pressure, set the dissolution temperature to 15° C.~40° C. and stirring speed to 200 r/min~600 r/min. After stirring for 10 min~60 min, tungsten source solution was prepared.

The concentration of tungsten source in the prepared tungsten source solution is 0.04 mol/L~1 mol/L.

Figure 4:
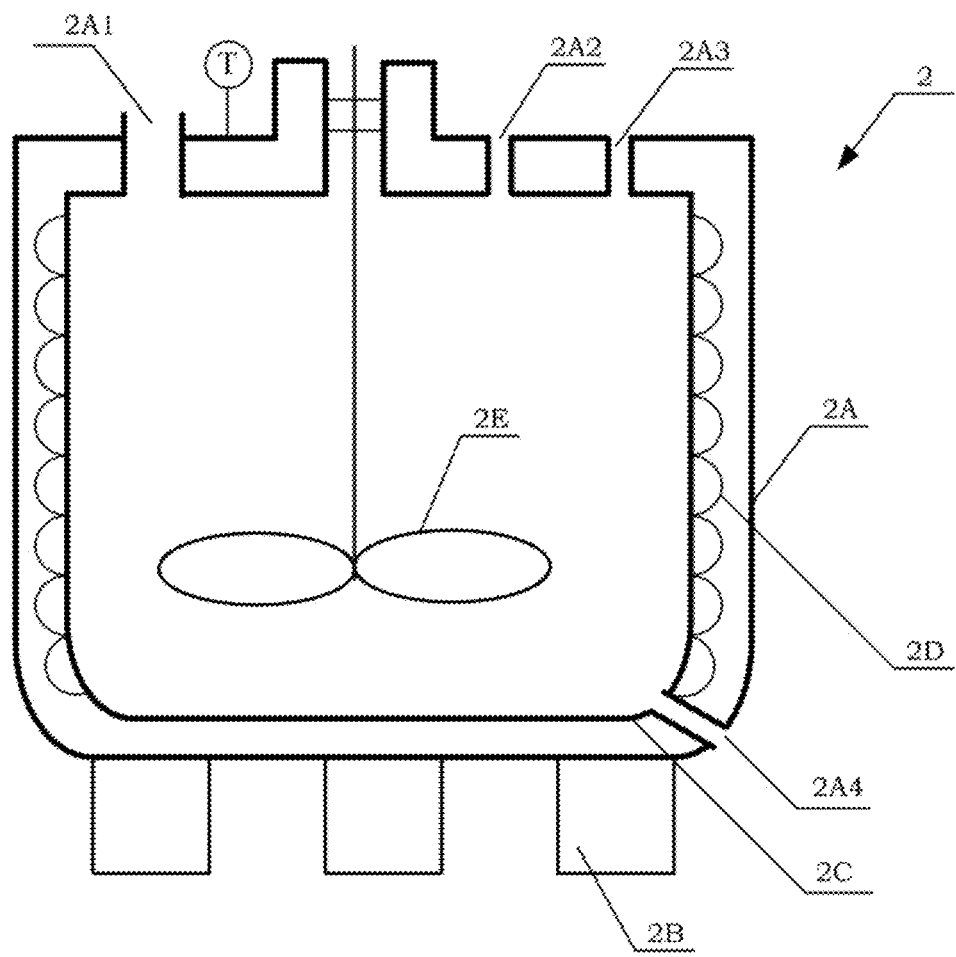
FIG. 4 is a structural section diagram of the second mixing vessel of the invention.

As shown in FIG. 4, the second mixing vessel 2 in the present invention is a double-layer stainless steel round drum. The second mixing container 2 is provided with an agitator 2E, which is used to provide the mixing speed of tungsten source solution in the preparation process, and the mixing speed is 200 r/min~600 r/min.

A tungsten source inlet 2A1, an alcohol source inlet 2A2 and an exhaust outlet 2A3 are arranged above the cylinder block 2A of the second mixing vessel 2. The exhaust outlet 2A3 is used to discharge the gas generated during the preparation of tungsten source solution to ensure the safety of the preparation process of tungsten source solution; The discharge port 2A4 for the tungsten source mixed solution is provided under the cylinder block 2A. The discharge port 2A4 can be communicated with the water bath heating container 3 through a connected pipe, on which a pressure gauge, flowmeter, valve, etc., can be arranged, as shown in FIG. 2.

The bottom of the second mixing container 2 is provided with a base 2B, the base 2B is used to support the mixing container on the one hand, on the other hand, it is also to keep the mixing container stable in the working state.

The outer wall of the inner shell 2C of the second mixing vessel 2 is wrapped with a resistance wire 2D, that is, the resistance wire 2D is arranged between the outer wall of the inner shell 2C and the inner wall of the cylinder block 2A, and is filled with insulation material. When the tungsten source solution is prepared, if the measured temperature in the second stirring container 2 measured by the thermometer is lower than the set dissolution temperature, the resistance wire 2D is needed to provide a heat source to heat the tungsten source solution in the preparation process.

In the invention, in order to monitor the temperature of the tungsten source solution in the preparation process, a temperature sensor is provided in the second stirring vessel 2 for measuring the dissolution temperature of the second solution in the preparation process. If the current dissolution temperature is lower than the set dissolution temperature (10° C.~40° C.), the resistance wire 2D is turned on to heat the tungsten source solution during the preparation process.

In the present invention, a second stirring vessel 2 May also be used to prepare an alkali metal source mixed solution.

In the present invention, a first stirring vessel 1 can also be used to prepare a tungsten source mixed solution.

Figure 5:
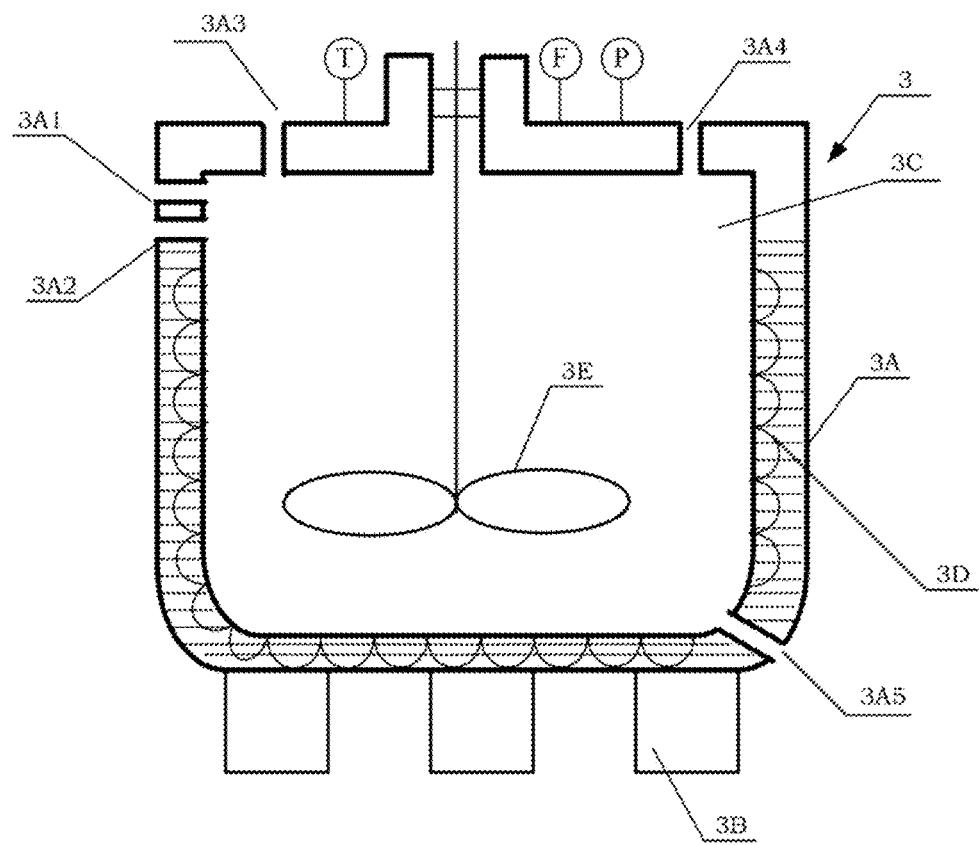
FIG. 5 is a structural section diagram of the water bath heating container of the invention.

Step 3. Heat by water-bath and hydrolyze to produce nano alkali tungsten bronze dispersion;

As shown in FIG. 1, FIG. 2 and FIG. 5, in the present invention, the alkali metal source solution and tungsten source solution are mixed by a water bath heating vessel in order to coordinate the alkali metal cation (M+) with tungsten salt, and then add deionized water to complete the gradual hydrolysis of the tungsten salt of the alkali metal cation coordination, and finally obtain the nano alkali metal tungsten bronze dispersion solution. The invention adopts the means of first coordination and then hydrolysis to rapidly limit the required alkali metal element (M) in the $M_xWO_3$ product, avoids the disadvantage that M+ cannot participate in the hydrolysis reaction in the later stage, and greatly improves the utilization rate of M element. The hexavalent tungsten in the mixed solution of alkali metal source solution and tungsten source solution is reduced by the ligation-induced electronic structure change, so that the required structure grains of nanometer alkali metal tungsten bronze are quickly formed in the mixed solution, and the industrial hydrolysis reaction rate is accelerated.

Dosage: 0.31 kg~18 kg of alkali metal source solution and 3.68 kg~92 kg of tungsten source solution are required for the preparation of 1 kg of alkali metal tungsten bronze powder.

One-step low-temperature heating hydrolysis of alkali metal tungsten bronze dispersion: alkali metal source solution, tungsten source solution and deionized water are added to the water bath heating container; Set the temperature of the water bath to 40° C.~90° C., set the stirring speed of the water bath heating container to 200 r/min~1000 r/min, and stir for 90 min~2880 min to obtain the alkali metal tungsten bronze dispersion.

In the invention, the low temperature environment of 40° C.~95° C. provided by the water bath heating vessel 3 is used to prepare the alkali metal tungsten bronze dispersion liquid, and the synthesis of alkali metal tungsten bronze is realized under extremely mild process conditions, avoiding the extreme conditions (high temperature and high pressure) required by the existing two traditional methods: solvothermal method and hydrothermal method. The high temperature and high-pressure special equipment are replaced by a water bath heating container, and the high complexity equipment is replaced by medium and low complexity equipment.

The use of water bath heating container 3 to prepare nano alkali metal tungsten bronze dispersion, avoiding the use of high temperature and high pressure special equipment in the mass production process, on the one hand, the use of water bath heater instead of high temperature and high pressure special equipment, can significantly reduce equipment procurement costs; On the other hand, the water bath heater is highly operable and simple to operate, and it will not add a lot of time costs in the implementation of process equipment iteration (such as training of experimental personnel), nor will it introduce excessive plant/laboratory design costs (such as HVAC, power distribution, etc.) that may be required to achieve equipment replacement.

In low temperature environment (40° C.~95° C.), water bath heater is used to prepare alkali metal tungsten bronze dispersion, which realizes the replacement of high complexity equipment with medium and low complexity equipment, and the replacement of high risk process flow with low risk process flow: On the basis of temperature adjustable, the introduction of stirring operation expands the process selectivity, improves the controllability of the reaction process, significantly improves the process safety, reduces the time cost required for the same output, and reduces the production energy consumption.

The water bath heating container 3 designed by the invention is shown in FIG. 5. The water bath heating container 3 is divided into heating cylinder 3C and water bathtub 3A, which are made of stainless steel. A heating coil 3D is arranged between the heating cylinder 3C and the water bath 3A, and the water bath 3A is filled with tap water. The heating cylinder 3C is provided with an agitator 3E, which is used to provide the stirring speed of the dispersion in the preparation process, and the stirring speed is 200 r/min~1000 r/min.

The water bath heating container 3 is provided with a CA feed port 3A1 (for the injection of alkali metal source solution), a CB feed port 3A2 (for the injection of tungsten source solution), a CC feed port 3A3 (for the injection of deionized water), and an exhaust port 3A4. The exhaust port 3A4 is used to discharge the gas generated during the preparation of the disperse liquid; The dispersion liquid discharge port 3A5 is arranged under the cylinder block 3A. The dispersion liquid discharge port 3A5 can be communicated with the solid-liquid separator 4 through a connected pipeline on which a pressure gauge, flowmeter, valve, etc., can be arranged.

The bottom of the water bath heating container 3 is provided with a base 3B, which on the one hand is used to support the water bath heating container, and on the other hand, it is also used to keep the water bath heating container stable under the stirring working state.

In the present invention, the outer wall of the heating cylinder 3C of the water bath heating container 3 is wrapped with a heating coil 3D (such as resistance wire) and soaked in tap water, that is, the heating coil 3D and the water required for heating the water bath are arranged between the outer wall of the heating cylinder 3C and the inner wall of the water bath 3A, the heating coil 3D is used to provide heat source for the tap water, and the insulation material wrapped in the outer wall of the water bath 3A. When preparing the dispersion, if the measured temperature in the water bath heating container 3 measured by the thermometer is lower than the set water bath temperature, the tap water needs to be heated through the heating coil 3D to provide a heat source for preparing the dispersion.

In the present invention, in order to monitor the temperature of the dispersion during the preparation process, a temperature sensor is provided in the water bath heating vessel 3 for measuring the dissolution temperature of the dispersion during the preparation process.

Figure 6:
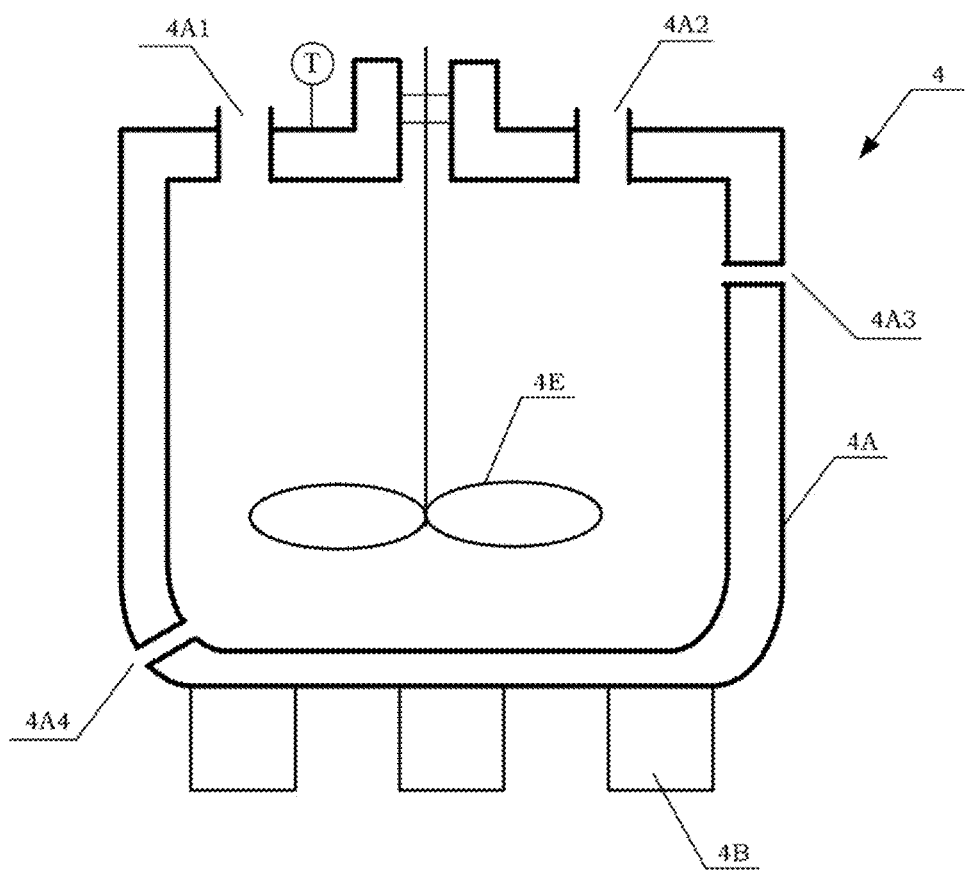
FIG. 6 is a structural section diagram of the solid-liquid separator of the invention.

Step 4. Solid-liquid separation;

In the present invention, as shown in FIG. 1, FIG. 2 and FIG. 6, adding the wash solution to the solid-liquid separation process for multiple washing can remove the residual organic impurities and inorganic impurities that may be adsorbate on the surface of the product, and avoid the secondary agglomeration of nano alkali tungsten bronze particles in the dispersion solution while purifying the product.

In the invention, the lotion is methanol ($CH_3OH$), ethanol ($CH_3CH_2OH$) and acetone ($C_3H_6O$); Or a combination of methanol and deionized water; The combination of ethanol and deionized water; Combination of acetone and deionized water.

Step 41. Add the alkali tungsten bronze dispersion liquid to the solid-liquid separator 4, and let it stand for 20-100 min to obtain the first precipitate and the first supernatant. And the first supernatant is discharged;

In the present invention, the maximum amount of alkali metal tungsten bronze dispersion liquid added to the solid-liquid separator 4 is two-thirds of the capacity of the solid-liquid separator.

Step 42. Add lotion to solid-liquid separator 4, which is 2 to 5 times of the first precipitate; The stirring speed of the solid-liquid separator was set to 200 r/min~600 r/min, and the second precipitation and the second supernatant were obtained after stirring for 10 min~60 min and standing for 20~100 min. And the second supernatant is discharged;

Step 43. Add lotion to the solid-liquid separator 4, which is 2 to 5 times the second precipitate; The stirring speed of the solid-liquid separator was set to be 200 r/min~600 r/min, and the third precipitation and third supernatant were obtained after stirring for 10 min~60 min and standing for 20~100 min. And the third supernatant is discharged;

Step 47. add lotion to solid-liquid separator 4, the solvent is 2 to 5 times of the third precipitate; The stirring speed of the solid-liquid separator is set to 200 r/min~600 r/min. After stirring for 10 min~60 min, alkali metal tungsten bronze dispersion was obtained.

The solid-liquid separator 4 designed by the invention is shown in FIG. 6. The solid-liquid separator 4 is a double-layer stainless steel round barrel. The interior of the solid-liquid separator 4 is provided with a stirrer 4E, which is used to provide the stirring speed of the dispersion liquid in the separation process, and the stirring speed is 200 r/min~600 r/min.

The cylinder block 4A of the solid-liquid separator 4 is provided with DA feed port 4A1 (for alkali metal tungsten bronze dispersion injection), DB feed port 4A2 (for wash injection) and DA discharge port 4A3 (for supernatant discharge); A DB discharge port 4A4 is arranged under the cylinder block 4A, and the DB discharge port 4A4 is used for discharging the alkali metal tungsten bronze liquid. In FIG. 2. The DB discharge port 4A4 can be communicated with the third agitator through a connected pipeline on which a pressure gauge, flowmeter, valve, etc., can be arranged.

The bottom of the solid-liquid separator 4 is provided with a base 4B, which on the one hand is used to support the solid-liquid separator, and on the other hand, it is also used to keep the solid-liquid separator stable under the agitation working state.

Step 5. Dry nano alkali tungsten bronze powder;

In the present invention, in order to analyze the properties of the nano alkali metal tungsten bronze liquid material prepared by step four, it is necessary to dry the nano alkali metal tungsten bronze liquid to obtain the nano alkali metal tungsten bronze powder. The cesium tungsten bronze liquid prepared in step four was dried by vacuum resistance furnace, the vacuum degree was $1 \times 10^{-2}$ Pa~$1 \times 10^{-4}$ Pa, the drying temperature was 50° C.~100° C., the drying time was 180 min~720 min, and the nano alkali tungsten bronze powder was obtained.

The nano alkali metal tungsten bronze powder obtained by the method of the invention through XRD pattern analysis is in line with the requirement of chemical formula $M_XWO_3$ ($0.2 \leq X \leq 0.33$). The better components obtained by the method of the invention are $Cs_{0.30}WO_3$ powder, $Rb_{0.28}WO_3$ powder, $K_{0.32}WO_3$ powder and $Na_{0.33}WO_3$ powder. By calculating the output of input raw materials and products, the industrial yield of nano-cesium tungsten bronze powder is 70%~85%, nano-rubidium tungsten bronze powder is 70%~85%, nano-potassium tungsten bronze powder is 60%~80% and nano-sodium tungsten bronze powder is 50%~75%.

The nanometer alkali metal tungsten bronze powder obtained by the method of the invention has a short rod-like shape or equiaxial shape, the length of the short rod-like structure is 10~150 nm, the diameter is 10~50 nm, and the dimensions of the equiaxial structure are less than 100 nm in each direction.

In the present invention, FIG. 1 aims to introduce the process of preparing nano alkali metal tungsten bronze powder by low-temperature cationic coordination tungsten saltwater hydrolysis. The difference in the process is that one step of low-temperature heating hydrolysis produces alkali metal tungsten bronze dispersion. The synthesis of pure phase alkali metal tungsten bronze in water bath under low temperature and no pressure is realized, the process conditions are mild, and the product (nano alkali metal tungsten bronze powder) has good crystallization, no need for subsequent calcination, and low energy consumption.

Under industrialization combined with the preparation of nano alkali metal tungsten bronze liquid in FIG. 1, as shown in FIG. 2, nano alkali metal tungsten bronze liquid is used to make nano alkali metal tungsten bronze coating, and nano alkali metal tungsten bronze coating is used to make nano alkali metal tungsten bronze coating on glass plate, and the glass loaded with nano alkali metal tungsten bronze coating is used to make indoor cooling brought by glass curtain wall. The steps of industrialized production of nano alkali tungsten bronze coating are as follows:

Step 1. Prepare the alkali metal source solution;

Step 11. Add deionized water to the first mixing container;

Step 12. Add the alkali metal source to the first mixing container; In the present invention, an alkali metal source includes one or two combinations of alkali metal ions salts corresponding to hydroxides, chloride salts, and nitrate, sulfate and carbonate.

The hydroxides are cesium hydroxide, potassium hydroxide or sodium hydroxide.

The chlorine salts are cesium chloride, rubidium chloride, potassium chloride or sodium chloride.

The nitrates are cesium nitrate, potassium nitrate or sodium nitrate.

The sulfates are cesium sulfate, potassium sulfate, or sodium sulfate.

The carbonates are cesium carbonate, potassium carbonate or sodium carbonate.

Step 13. Under normal pressure, set the dissolution temperature to 10° C.~40° C. and stirring speed to 200 r/min~600 r/min. After stirring for 10 min~60 min, alkali metal source solution was prepared.

The alkali metal source concentration in the prepared alkali metal source solution is 0.5 mol/L~5 mol/L.

Step 2. Prepare tungsten source solution;

Step 21. Add the tungsten source to the second mixing container; In the present invention, tungsten source is tungsten hexachloride (WCl6) or tungsten tetrachloride ($WCl_4$).

Step 22, add the alcohol solution to the second stirring container; In the present invention, the alcohol solution is one, two or a combination of methanol ($CH_3OH$), ethanol ($CH_3CH_2OH$), n-propanol ($CH_3(CH_2)_2OH$), isopropanol ($CH(CH_3)_2OH$) and n-butanol ($CH_3(CH_2)_3OH$).

Step 23. Under normal pressure, set the dissolution temperature to 15° C.~40° C. and stirring speed to 200 r/min~600 r/min. After stirring for 10 min~60 min, tungsten source solution was prepared.

The concentration of tungsten source in the prepared tungsten source solution is 0.05 mol/L~1 mol/L.

Step 3. Heat by water-bath and hydrolyze to produce nano alkali tungsten bronze dispersion;

Dosage: 0.37 kg~3.6 kg of alkali metal source solution and 3.68 kg~73.6 kg of tungsten source solution are required to prepare 1 kg of alkali metal tungsten bronze powder.

One-step low-temperature heating hydrolysis of alkali metal tungsten bronze dispersion: alkali metal source solution, tungsten source solution and deionized water are added to the water bath heating container; Set the temperature of the water bath to 40° C.~90° C., set the stirring speed of the water bath heating container to 200 r/min~1000 r/min, and stir for 90 min~2880 min to obtain the dispersion.

Step 4. Solid-liquid separation;

In the invention, the lotion is methanol ($CH_3OH$), ethanol ($CH_3CH_2OH$) and acetone ($C_3H_6O$); Or a combination of methanol and deionized water; The combination of ethanol and deionized water; Combination of acetone and deionized water.

Step 41. Add alkali metal tungsten bronze dispersion liquid to the solid-liquid separator and let it stand for 20-100 min to obtain the first precipitate and the first supernatant. And the first supernatant is discharged;

Step 42. Add lotion to the solid-liquid separator, which is 2 to 5 times of the first sediment; The stirring speed of the solid-liquid separator was set to 200 r/min~600 r/min, and the second precipitation and the second supernatant were obtained after stirring for 10 min~60 min and standing for 20~100 min. And the second supernatant is discharged;

Step 43. Add lotion to the solid-liquid separator, which is 2 to 5 times of the second precipitate; The stirring speed of the solid-liquid separator was set to be 200 r/min~600 r/min, and the third precipitation and third supernatant were obtained after stirring for 10 min~60 min and standing for 20~100 min. And the third supernatant is discharged;

Step 47. Add lotion to the solid-liquid separator, the solvent is 0.5~2 times of the third precipitate; The stirring speed of the solid-liquid separator is set to 200 r/min~600 r/min. After stirring for 10 min~60 min, alkali metal tungsten bronze dispersion was obtained.

Step 5. Prepare alkali metal tungsten bronze coating;

Dosage (weight): alkali metal tungsten bronze dispersion: PVA: deionized water=1:2~15:80~130.

The alkali metal tungsten bronze dispersion, PVA (polyvinyl alcohol) and deionized water were added to the third mixing vessel. Set the stirring speed of the third mixing container to 100 r/min~400 r/min; After stirring 30 min~120 min, alkali metal tungsten bronze coating was obtained.

In the present invention, the structure of the third stirring vessel may be the same as that of the first stirring vessel.

Step 6. Spray process to make glass curtain wall;

The alkali metal tungsten bronze coating is injected into the silo of the spraying machine through the pipeline, and the spraying distance between the nozzle and the upper surface of the glass plate H=0.5~2 cm; The flow rate of alkali metal tungsten bronze coating is 1~7 ml/min.

The hot air temperature provided by the hot fan is 22° C.~40° C., and the transmission roller speed is 10 r/min~60 r/min. After curing, the nano alkali metal tungsten bronze coating on the upper surface of the glass is prepared.

Figure 7:
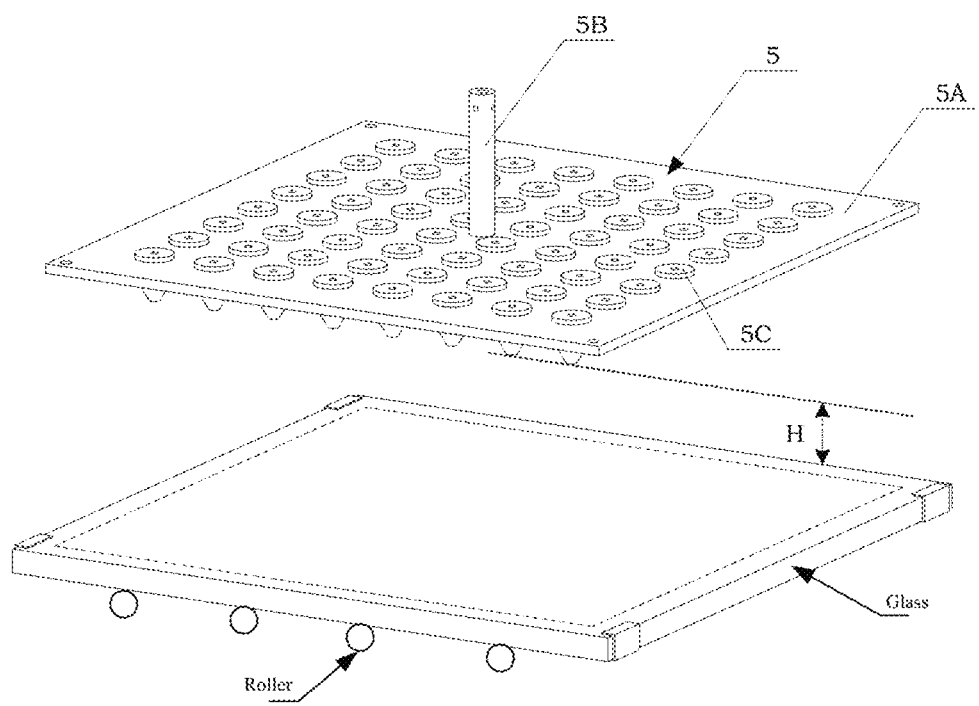
FIG. 7 is a schematic diagram of an array arrangement nozzle in the sprayer of the invention.

In the invention, glass coated with nano alkali metal tungsten bronze is used to make a glass curtain wall. In order to realize large-size spraying of the glass curtain wall, the invention adopts a structure of array nozzle arrangement, as shown in FIG. 7. The array on the plate 5A of the nozzle mechanism 5 is arranged with an ultrasonic atomizing nozzle 5C. The ultrasonic atomizing nozzle 5C is communicated with the silo of the sprayer through a flexible conduit, and the silo is communicated with the discharge port of the third mixing container through a pipeline. The center of the plate 5A is provided with a column 5B, which is fixed with the shell of the sprayer.

In the invention, the nozzle diameter of the ultrasonic atomizing nozzle 5C is 10~30 mm, and the nozzle diameter is 0.5~2 mm. The number of ultrasonic atomizing nozzles 5C set on the plate 5A is determined according to the size of the glass curtain wall made and the diameter of the nozzle and the diameter of the nozzle.

Example 1 Preparation of Cesium Tungsten Bronze $Cs_{0.30}WO_3$

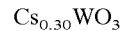

As shown in FIG. 2, steps 1 to 4 of the invention are a method for industrializing preparation of nano alkali metal tungsten bronze by hydrolysis of a coordination compound of cation at a lower temperature, and steps 5 to 6 are a method for preparing nano alkali metal tungsten bronze coating. The nano alkali metal tungsten bronze obtained by the method of the invention is made into nano alkali metal tungsten bronze coating, and then the nano alkali metal tungsten bronze coating is made on the glass plate by spraying process, and the glass loaded with nano alkali metal tungsten bronze coating is applied to the glass curtain wall. The present example specifically refers to the preparation and application of nano-cesium tungsten bronze and its coating. The specific preparation steps are as follows:

Step 1. Prepare the cesium source solution;

Dosage: The concentration of cesium source in cesium source solution is 1 mol/L.

Cesium chloride (CsCl) and deionized water are added to the first mixing vessel; Under normal pressure, the solution of cesium source was prepared after the solution temperature was set at 25° C., stirring speed was 400 r/min and stirring for 5 min.

Step 2. Prepare tungsten source solution;

Dosage: Tungsten source concentration in tungsten source solution is 0.1 mol/L.

Add $WCl_6$ and $CH_3CH_2OH$ to the second mixing container; Under normal pressure, the solution was prepared by setting the dissolution temperature at 30° C., stirring speed at 300 r/min and stirring for 25 min.

Step 3. Heat by water-bath and hydrolyze to produce nano alkali tungsten bronze dispersion;

Dosage: 0.61 kg of cesium source solution and 46.12 kg of tungsten source solution are required to prepare 1 kg of cesium tungsten bronze powder.

One-step low temperature heating hydrolysis to make dispersion liquid: cesium source solution and tungsten source solution are added to the water bath heating container; Set the temperature of the water bath to 70° C., set the stirring speed of the water bath heating container to 500 r/min, and get the dispersion after stirring for 240 min.

Step 4. Solid-liquid separation;

In Example 1, the lotion is $CH_3CH_2OH$.

Step 41. Add the dispersion liquid to the solid-liquid separator and let it stand for 60 minutes to obtain the first precipitate and the first supernatant. And the first supernatant is discharged;

Step 42. Add lotion to the solid-liquid separator, which is 3 times of the first sediment; The stirring speed of the solid-liquid separator was set to 300 r/min, and the second precipitation and the second supernatant were obtained after stirring for 30 min and standing for 90 min. And the second supernatant is discharged;

Step 43. Add lotion to the solid-liquid separator, which is 3 times of the second sediment; The stirring speed of the solid-liquid separator was set to 300 r/min, and the third precipitation and third supernatant were obtained after stirring for 60 min and standing for 60 min. And the third supernatant is discharged;

Step 47. Add deionized water to the solid-liquid separator, and the solvent is twice that of the third precipitate; The stirring speed of the solid-liquid separator is set to 300 r/min. Cesium tungsten bronze dispersion was obtained after stirring for 30 min.

The characteristics and properties of cesium tungsten bronze powder were obtained by method of Example 1

The cesium tungsten bronze dispersion obtained in step 4 was dried by vacuum resistance furnace at 60° C. and vacuum drying for 240 min to obtain $Cs_{0.3}WO_3$ cesium tungsten bronze powder, that is, powder. The industrial yield of $Cs_{0.3}WO_3$ powder is as high as 80% by calculating the output of input raw materials and products.

Figure 8:
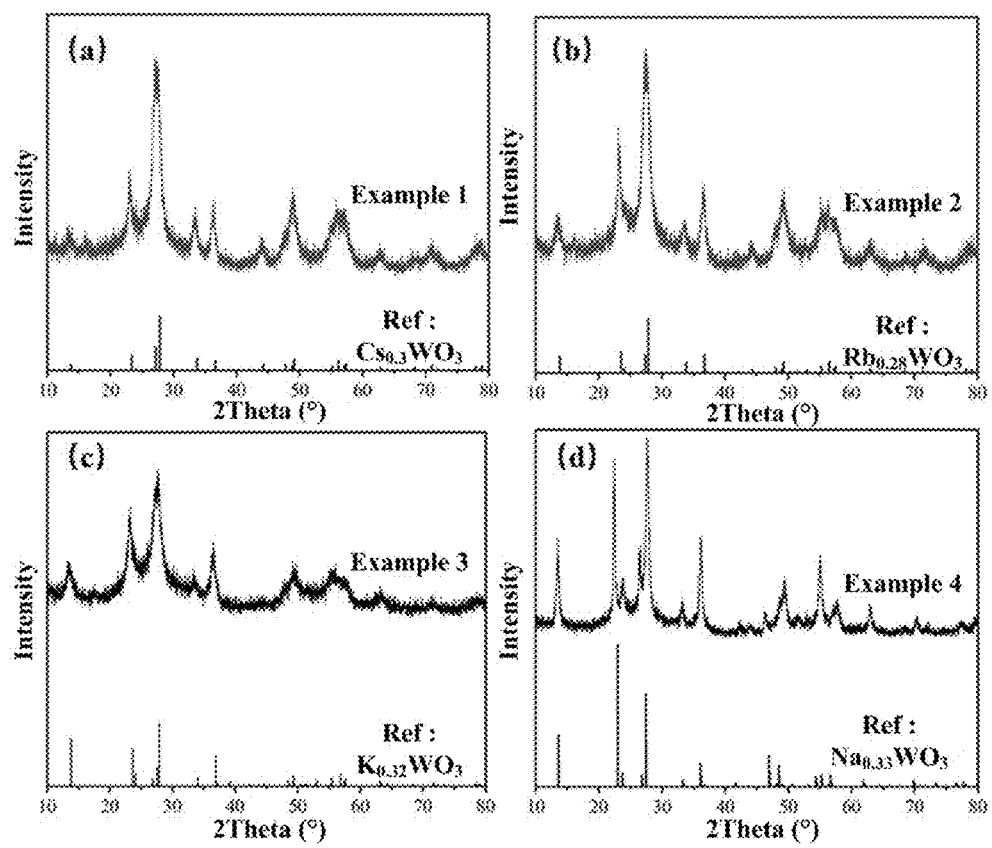
FIG. 8 shows the XRD patterns of the target products obtained in examples 1, 2, 3, and 4.

In the XRD pattern shown in FIG. 8, all the diffraction peaks of the cesium tungsten bronze powder obtained by example 1 method belong to $Cs_{0.3}WO_3$, indicating that pure phase cesium tungsten bronze has been synthesized.

Figure 9:
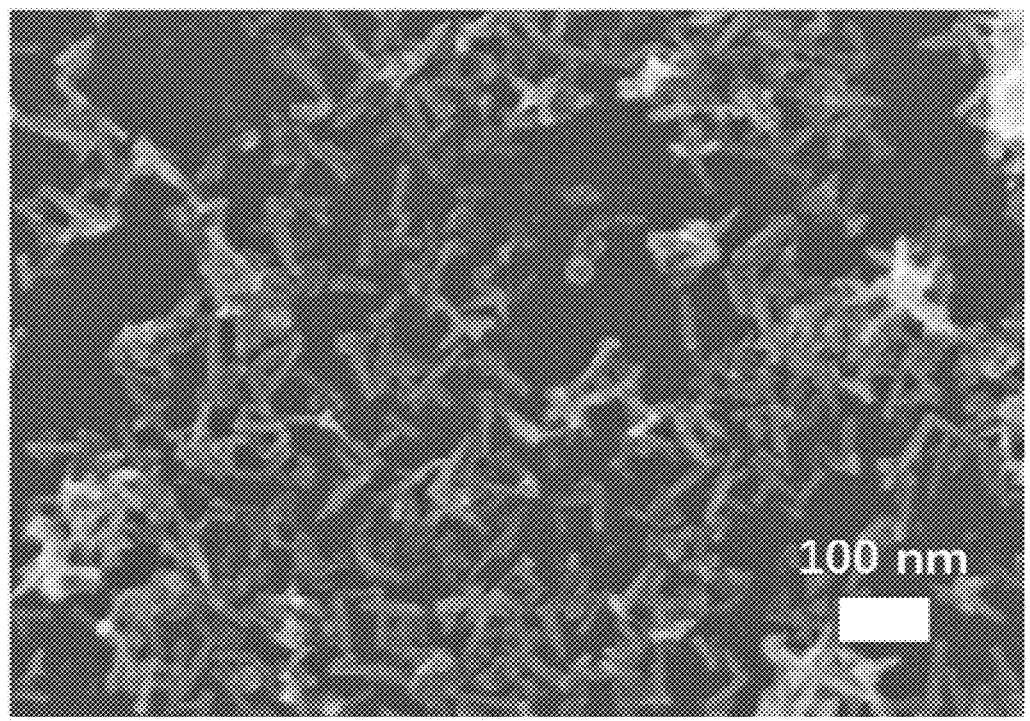
FIG. 9 is an SEM photo of the target product obtained in Example 1.
Figure 10:
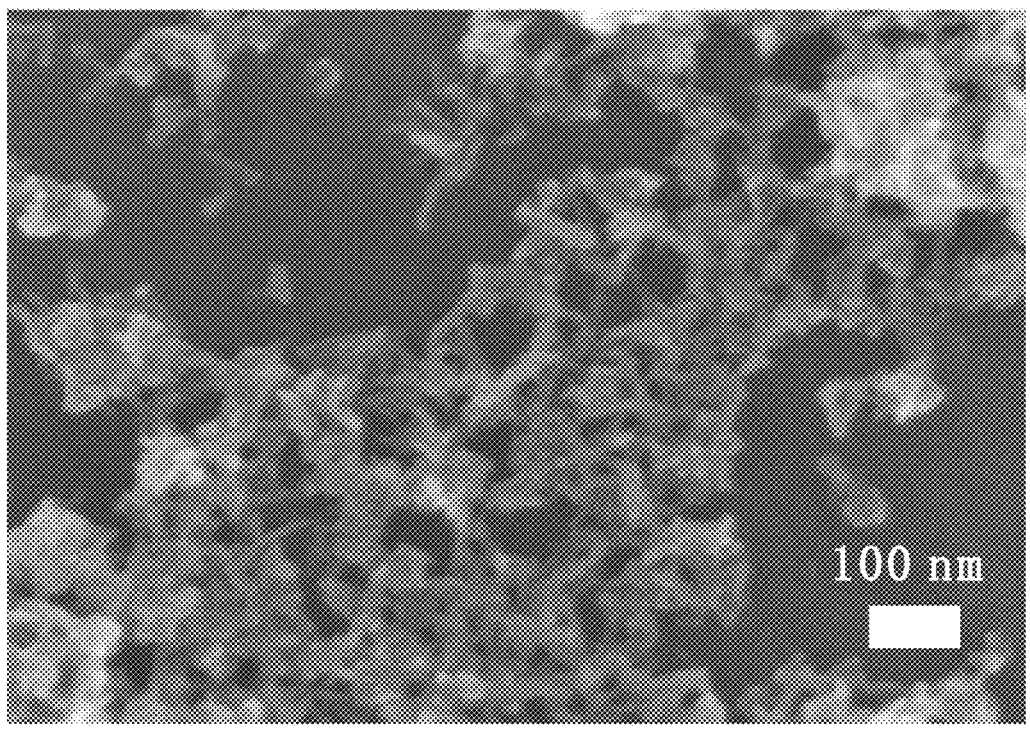
FIG. 10 is an SEM photo of the target product obtained in example 2.
Figure 11:
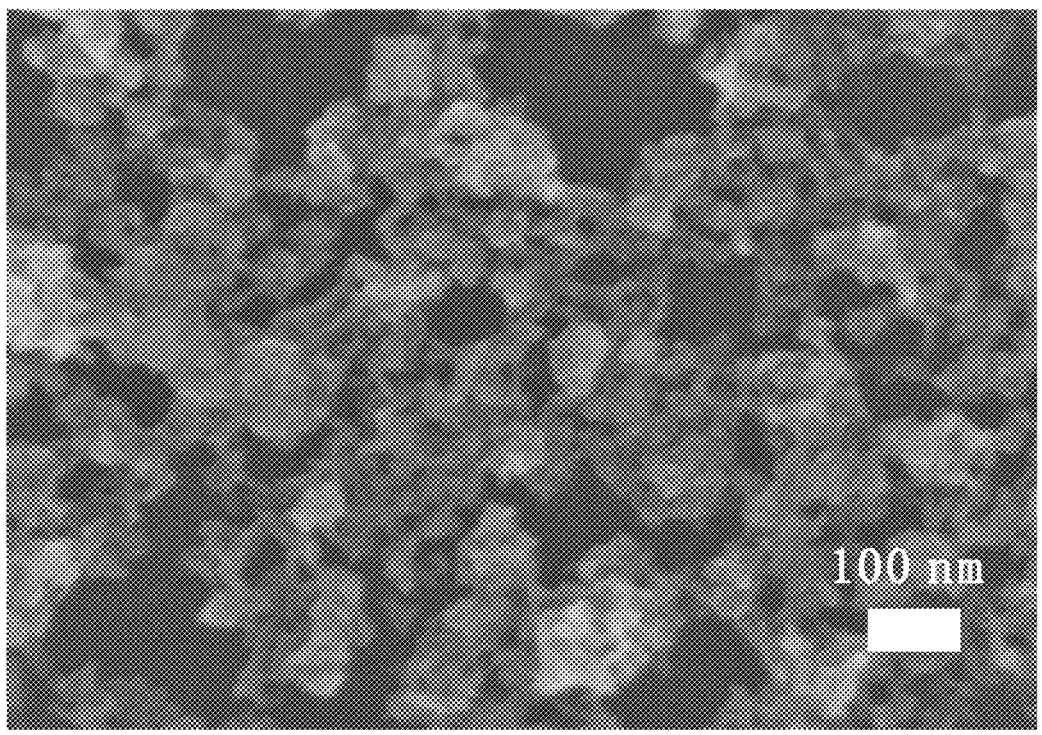
FIG. 11 is an SEM photo of the target product obtained in example 3.
Figure 12:
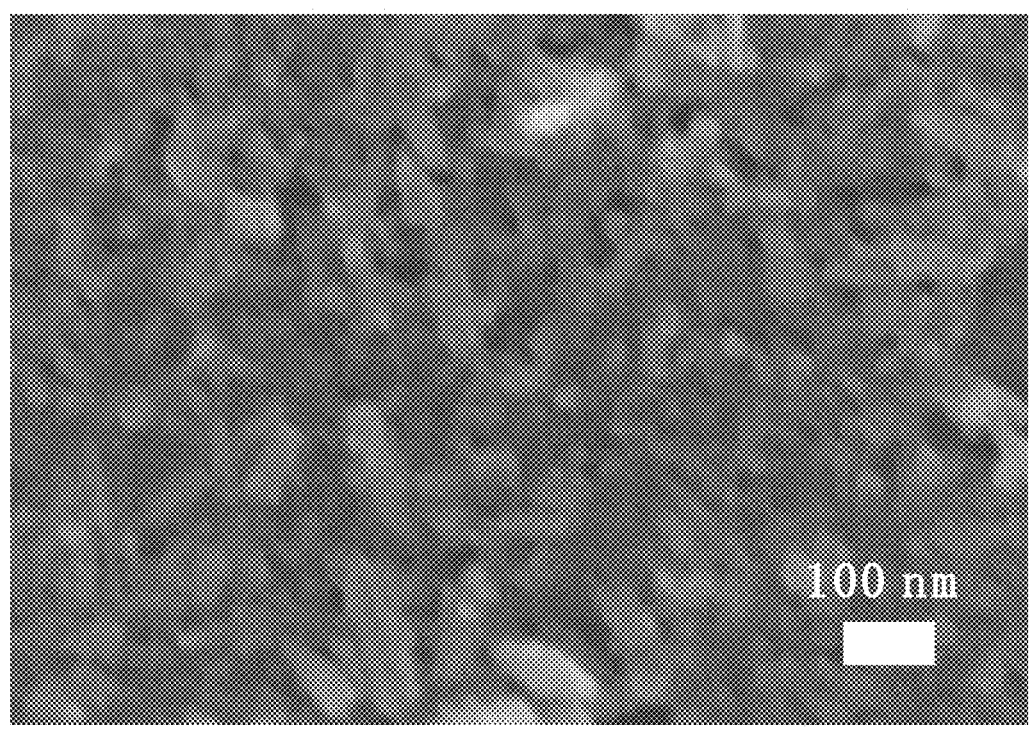
FIG. 12 is an SEM photo of the target product obtained in example 4.

In the SEM spectrum shown in FIG. 9, the $Cs_{0.3}WO_3$ powder obtained by the method of example 1 has a short rod-like morphology, and the length of the short rod-like structure is 10~140 nm and the diameter is 10~20 nm.

Figure 13:
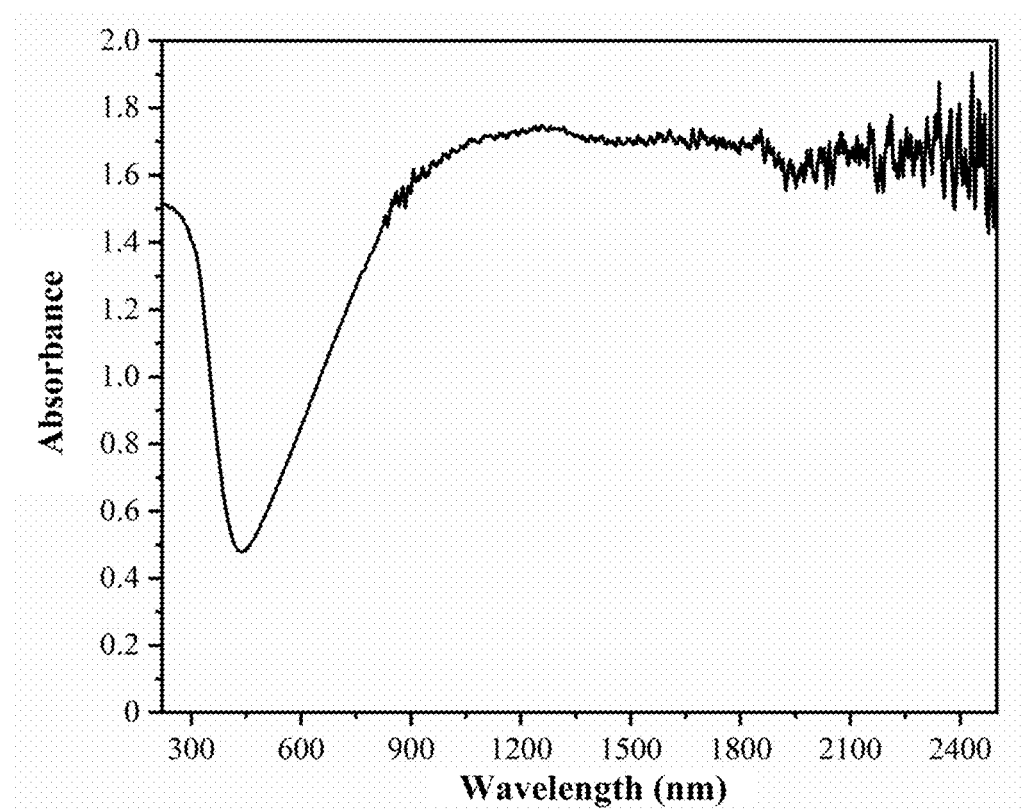
FIG. 13 shows the NIR shielding properties of the powder obtained in example 1.

In the UV-VIS-NIR spectrum shown in FIG. 13, the $Cs_{0.3}WO_3$ powder obtained by the method of example 1 has excellent near-infrared shielding properties, high visible light transmittability and good Uv shielding properties.

Figure 14:
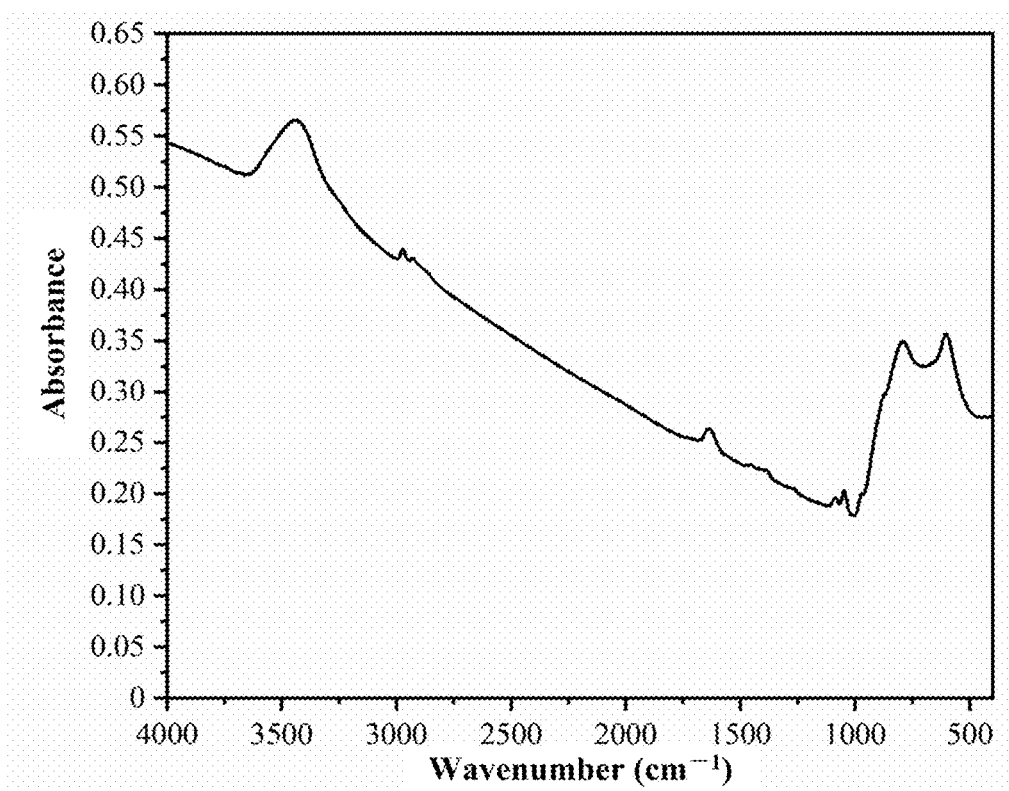
FIG. 14 shows the middle and far infrared shielding properties of the powder obtained in example 1.

In the FTIR spectrum shown in FIG. 14, the $Cs_{0.3}WO_3$ powder obtained by the method of Example 1 has certain middle and far infrared shielding properties.

Figure 15:
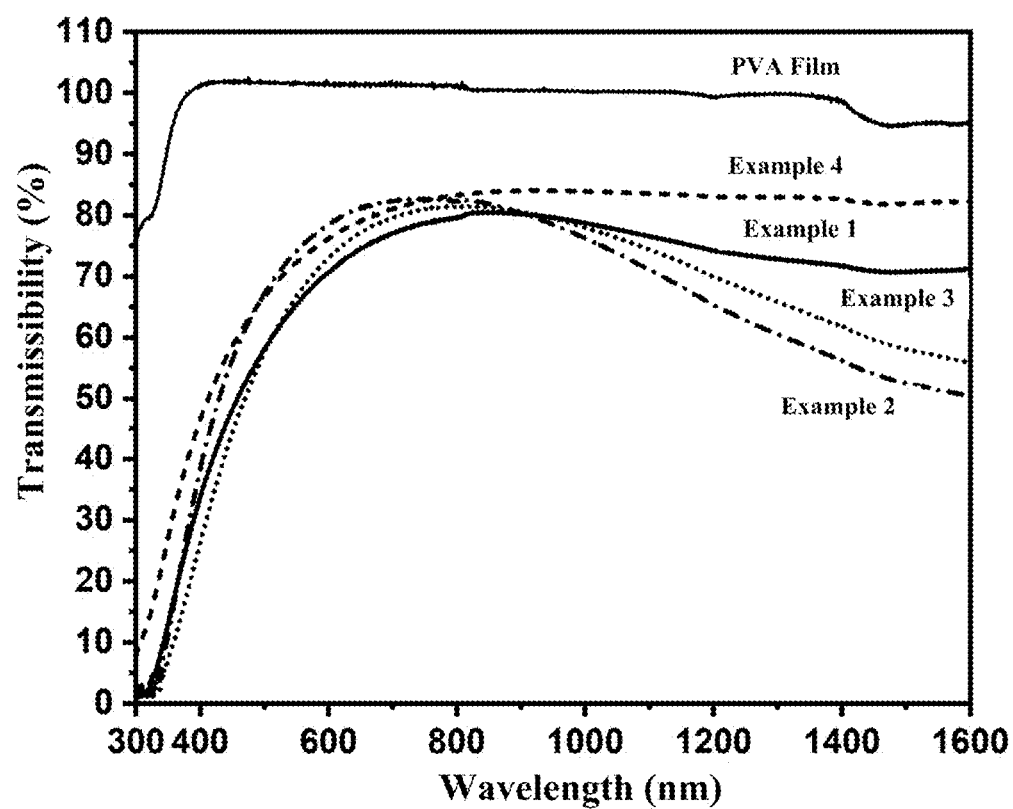
FIG. 15 shows the Uv-Vis-NIR transmissibility spectra of the target product and PVA composite membrane obtained in examples 1, 2, 3, and 4.

In the Uv-Vis-NIR spectrum shown in FIG. 15, the $Cs_{0.3}WO_3$ powder and PVA composite film prepared by the method of example 1 has higher near-infrared absorption properties, ultraviolet shielding properties and higher visible light transmission properties.

Step 5. Prepare cesium tungsten bronze coating;

Dosage (weight): cesium tungsten bronze dispersion: PVA: deionized water=1:5:94.

Cesium tungsten bronze dispersion, PVA and deionized water were added to the third mixing vessel. Set the stirring speed of the third mixing container to 300 r/min; Cesium tungsten bronze coating was obtained after stirring for 60 min.

Step 6. Spray process to make glass curtain wall;

The cesium tungsten bronze coating is injected into the bin of the spraying machine through a pipe, and the spraying distance between the nozzle and the upper surface of the glass plate is set to H=1 cm; The flow rate of cesium tungsten bronze coating is 4 ml/min.

The cesium tungsten bronze coating on the upper surface of the glass is prepared after curing at a hot air temperature of 35° C. provided by the hot fan and a transmission roller speed of 50 r/min.

Figure 16:
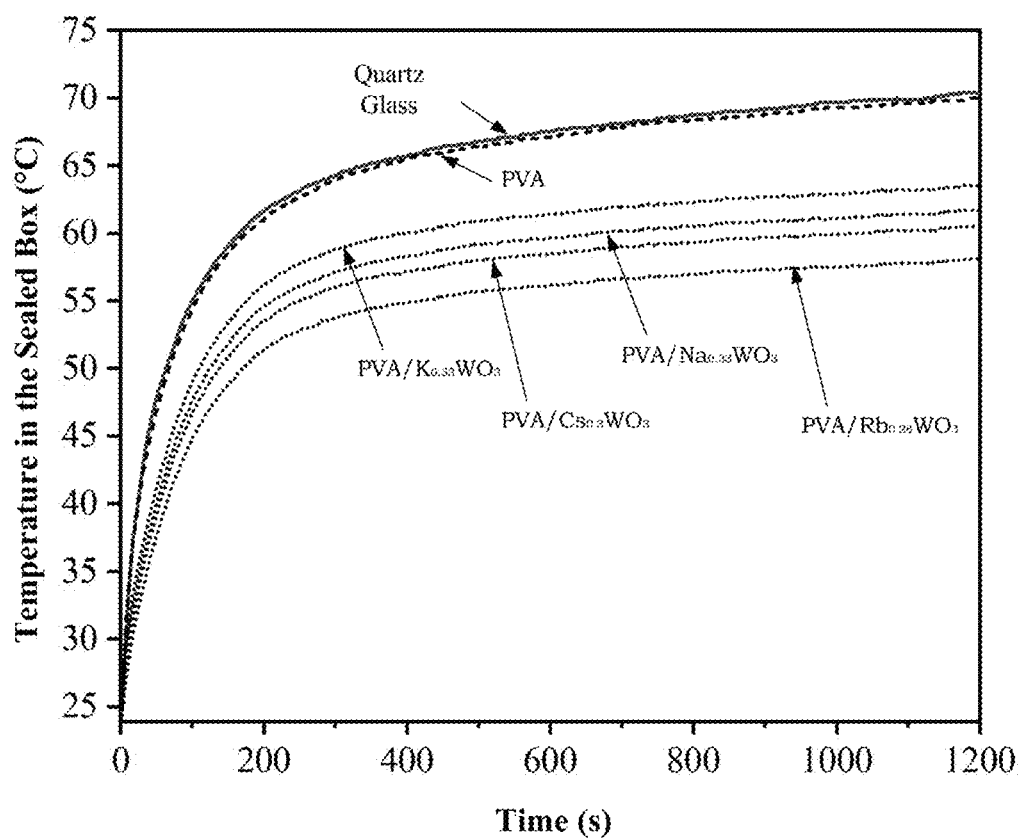
FIG. 16 shows the temperature change curve with time in the sealed box of quartz glass covered with PVA/M$_{0.3}$WO$_3$ film in Example 1 under the irradiation of a 50 W sun lamp.

In the test of photothermal conversion and thermal insulation performance of the cesium tungsten bronze coating on the upper surface of the glass as shown in FIG. 16, a 50 W halogen lamp is used to illuminate the glass from a distance of 20 cm from the upper surface of the glass. Compared with quartz glass without thermal insulation coating or with only PVA coating, the glass with thermal insulation coating on the upper surface of the glass made in Example 1 reduces the temperature in the box by 13° C. The decline reached 18.6 percent. The heat insulation principle of the $Cs_{0.3}WO_3$ coating prepared by Example 1 is that the cesium tungsten bronze in the coating absorbs near-infrared light and converts it into heat energy outside the box to achieve heat insulation effect. Therefore, the $Cs_{0.3}WO_3$ coating prepared by Example 1 method has high photothermal conversion performance and heat insulation performance.

The glass with $Cs_{0.3}WO_3$ coating on the upper surface prepared in example 1 is turned over so that the thermal insulation coating on the upper surface of the glass can also be used to heat the interior of the cabinet after the $Cs_{0.3}WO_3$ coating has high photothermal conversion and thermal insulation properties. Thermal management can be performed effectively by adjusting the relative position of the thermal insulation coating prepared in Example 1.

The one-step low-temperature heating hydrolysis method adopted by the invention is to generate dispersed uniform nanoparticles by forced hydrolysis of metal salts under acidic conditions. Compared with hydrothermal method and solvothermal method, hydrolysis method has low reaction temperature, high yield, no reaction pressure and is safer. Hydrothermal method and solvothermal method both refer to the synthesis of substances in solution by chemical reaction at a certain temperature (100° C.~1000° C.) and pressure (1 MPa~100 MPa).

Example 2 Preparation of Rubidium Tungsten Bronze $Rb_{0.28}WO_3$

As shown in FIG. 1, the method for industrializing preparation of nano-rubidium tungsten bronze by hydrolysis of a coordination compound of cation at a lower temperature comprises the following preparation steps:

Step 1. Prepare rubidium source solution;

Dosage: The concentration of rubidium source in rubidium source solution is 1 mol/L.

Rubidium chloride (RbCl) and deionized water are added to the first mixing vessel; The rubidium source solution was prepared after the solution temperature was set at 25° C., the stirring speed was 400 r/min and the stirring speed was 20 min under atmospheric pressure.

Step 2. Prepare tungsten source solution;

Dosage: Tungsten source concentration in tungsten source solution is 0.1 mol/L.

Add $WCl_6$ and $CH_3CH_2OH$ to the second mixing container; Under normal pressure, the solution was prepared by setting the dissolution temperature at 40° C., stirring speed at 300 r/min and stirring for 50 min.

Step 3. Heat by water-bath and hydrolyze to produce nano alkali tungsten bronze dispersion;

Dosage: 0.61 kg rubidium source solution and 49.2 kg tungsten source solution are required for the preparation of 1 kg cesium tungsten bronze powder.

One-step low temperature heating hydrolysis to prepare dispersion liquid: rubidium source solution and tungsten source solution are added to the water bath heating container; Set the temperature of the water bath to 70° C., set the stirring speed of the water bath heating container to 500 r/min, and get the dispersion after stirring for 600 min.

Step 4. Solid-liquid separation;
In example 2, the lotion is $CH_3CH_2OH$.
Step 41: Add the dispersion liquid to the solid-liquid separator and let it stand for 40 min to obtain the first precipitate and the first supernatant. And the first supernatant is discharged;
Step 42. Add lotion to the solid-liquid separator, which is 3.5 times of the first sediment; The stirring speed of the solid-liquid separator was set to 400 r/min, and the second precipitation and the second supernatant were obtained after stirring for 20 min and standing for 80 min. And the second supernatant is discharged;
Step 43. Add lotion to the solid-liquid separator, which is 3 times of the second sediment; The stirring speed of the solid-liquid separator was set to 400 r/min, and the third precipitation and the third supernatant were obtained after stirring for 20 min and standing for 80 min. And the third supernatant is discharged;
Step 47. Add lotion to the solid-liquid separator, and the solvent is 1 time of the third precipitate; The stirring speed of the solid-liquid separator is set to 400 r/min. Rubidium tungsten bronze dispersion was obtained after stirring for 30 min.

Characteristics and Properties of Rubidium Tungsten Bronze Prepared by Examples 2 Method The rubidium tungsten bronze dispersion obtained in step 4 was dried by vacuum resistance furnace at 60° C. and vacuum drying for 480 min to obtain the rubidium tungsten bronze powder, namely $Rb_{0.28}WO_3$ powder. The industrial yield of $Rb_{0.28}WO_3$ powder is as high as 75% by calculating the output of input raw materials and products.

In the XRD pattern shown in FIG. 8, all the diffraction peaks of the rubidium tungsten bronze powder obtained by the example 2 method belong to $Rb_{0.28}WO_3$, indicating that pure phase rubidium tungsten bronze has been synthesized.

In the SEM shown in FIG. 9, the morphology of $Rb_{0.28}WO_3$ powder obtained by the example 2 method is short rod-like, and the length of the short rod-like structure is 10~100 nm and the diameter is 15~30 nm.

By UV-VIS-NIR spectrum test, $Rb_{0.28}WO_3$ powder obtained by embodim-2 method has excellent near-infrared shielding properties, high visible light transmittance and good Uv shielding properties.

The $Rb_{0.28}WO_3$ powder obtained by the method of example 2 has certain middle and far infrared shielding properties after FTIR spectrogram test.

In the Uv-Vis-NIR spectrum shown in FIG. 15, the $Rb_{0.28}WO_3$ powder and PVA composite film prepared by embodims-2 method has higher near-infrared absorption properties, ultraviolet shielding properties and higher visible light transmission properties.

Step 5. Prepare rubidium tungsten bronze coating;
Dosage (weight): rubidium tungsten bronze dispersion: PVA: deionized water=1:6:94.
Rubidium tungsten bronze dispersion, PVA and deionized water were added to the third mixing vessel. Set the stirring speed of the third mixing container to 300 r/min; Rubidium tungsten bronze coating was obtained after stirring for 50 min.

Step 6. Spray process to make glass curtain wall;
The rubidium tungsten bronze coating is injected into the silo of the spraying machine through a pipe, and the spraying distance between the nozzle and the upper surface of the glass plate is set H=2 cm; The rubidium tungsten bronze coating has a flow rate of 3.5 ml/min.

The rubidium tungsten bronze coating on the upper surface of the glass is prepared after curing at a hot air temperature of 40° C. provided by the hot fan and a transmission roller speed of 40 r/min.

In the photothermal conversion and thermal insulation performance test of rubidium tungsten bronze coating on the upper surface of the glass shown in FIG. 16, the glass with a 50 W halogen lamp is irradiated from a distance of 20 cm from the upper surface of the glass. Compared with quartz glass without thermal insulation coating or with only PVA coating, the glass with thermal insulation coating on the upper surface of the glass prepared in Example 2 reduces the temperature in the chamber by 15.5° C. The drop reached 22.1 percent. The thermal insulation principle of the $Rb_{0.28}WO_3$ coating prepared by Example 2 is that the rubidium tungsten bronze in the coating absorbs near-infrared light and converts it into heat energy outside the box to achieve thermal insulation effect. Therefore, the $Rb_{0.28}WO_3$ coating prepared by Example 2 method has high photothermal conversion performance and thermal insulation performance.

The glass with $Rb_{0.28}WO_3$ coating on the upper surface prepared in Example 2 can be turned over so that the thermal insulation coating on the upper surface of the glass can also be used to heat the interior of the cabinet after the $Rb_{0.28}WO_3$ coating has high photothermal conversion and thermal insulation properties. Thermal management can be performed effectively by adjusting the relative position of the thermal insulation coating prepared in Example 2.

Example 3 Preparation of Potassium-Tungsten Bronze $K_{0.32}WO_3$

As shown in FIG. 1, the method for industrializing preparation of nano-potassium-tungsten bronze by hydrolysis of a coordination compound of cation at a lower temperature comprises the following preparation steps:

Step 1. Prepare potassium source solution;
Dosage: Potassium source concentration in potassium source solution is 2 mol/L.
Add potassium chloride (KCl) and deionized water to the first mixing vessel; Under atmospheric pressure, the solution was prepared by setting the solution temperature at 25° C., stirring speed at 400 r/min and stirring for 20 min.

Step 2. Prepare tungsten source solution;
Dosage: Tungsten source concentration in tungsten source solution is 0.1 mol/L.
Add $WCl_6$ and $CH_3CH_2OH$ to the second mixing container; Under normal pressure, the solution was prepared by setting the dissolution temperature at 40° C., stirring speed at 300 r/min and stirring for 50 min.

Step 3. Heat by water-bath and hydrolyze to produce nano alkali tungsten bronze dispersion;
Dosage: 0.85 kg of potassium source solution and 49.2 kg of tungsten source solution are required for preparing 1 kg of potassium-tungsten bronze powder.

One-step low temperature heating hydrolysis to produce dispersion: potassium source solution and tungsten source solution are added to the water bath heating container; Set the temperature of the water bath to 70° C., set the stirring speed of the water bath heating container to 500 r/min, and get the dispersion after stirring for 720 min.

Step 4. Solid-liquid separation;
In example 3, the lotion is $C_3H_6O$.
Step 41: Add the dispersion liquid to the solid-liquid separator and let it stand for 90 minutes to obtain the first precipitate and the first supernatant. And the first supernatant is discharged;
Step 42. Add lotion to the solid-liquid separator, which is 4 times of the first sediment; The stirring speed of the solid-liquid separator was set to 300 r/min, and the second precipitation and the second supernatant were obtained after stirring for 50 min and standing for 60 min. And the second supernatant is discharged;
Step 43. Add lotion to the solid-liquid separator, which is 4 times of the second precipitate; The stirring speed of the solid-liquid separator was set to 300 r/min, and the third precipitation and the third supernatant were obtained after stirring for 40 min and standing for 40 min. And the third supernatant is discharged;
Step 47. Add lotion to the solid-liquid separator, the solvent is 1.5 times of the third precipitate; The stirring speed of the solid-liquid separator is set to 300 r/min. Potassium-tungsten bronze dispersion was obtained after stirring for 60 min.

Characteristics and Properties of Potassium-Tungsten Bronze Obtained by Examples 3 Method The potassium-tungsten bronze dispersion prepared in step four was dried by vacuum resistance furnace at 60° C. and vacuum drying for 480 min to obtain the potassium-tungsten bronze powder, namely $K_{0.32}WO_3$ powder. By calculating the output of input raw materials and products, the industrial yield of $K_{0.32}WO_3$ powder is as high as 75%.

In the XRD pattern shown in FIG. 8, all the diffraction peaks of the potassium-tungsten bronze powder obtained by example 3 method belong to $K_{0.32}WO_3$, indicating that pure phase potassium-tungsten bronze has been synthesized.

In the SEM spectrum shown in FIG. 9, the $K_{0.32}WO_3$ powder obtained by the example 3 method has an isometric morphology, and the size distribution of the isometric structure ranges from 15 to 100 nm. By UV-VIS-NIR spectrum test, $K_{0.32}WO_3$ powder obtained by embodims-3 method has excellent near-infrared shielding properties, high visible light transmittance and good Uv shielding properties.

The $K_{0.32}WO_3$ powder obtained by the example 3 method has certain middle and far infrared shielding properties after FTIR spectrogram test.

In the Uv-Vis-NIR spectrum shown in FIG. 15, the $K_{0.32}WO_3$ powder and PVA composite film prepared by the example 3 method has higher near-infrared absorption properties, ultraviolet shielding properties and higher visible light transmission properties.

Step 5. Preparation of potassium-tungsten bronze coating;
Dosage (by weight): Potassium tungsten bronze dispersion:PVA: deionized water=1:5:100.
Add potassium-tungsten bronze dispersion, PVA and deionized water to the third mixing vessel; Set the stirring speed of the third mixing container to 400 r/min; Potassium-tungsten bronze coating was obtained after stirring for 40 min.

Step 6. Spray process to make glass curtain wall;
The potassium-tungsten bronze coating is injected into the silo of the spraying machine through the pipe, and the spraying distance between the nozzle and the upper surface of the glass plate is set to H=1.5 cm; The flow rate of potassium tungsten bronze coating is 3 ml/min. Under the hot air temperature of 40° C. provided by the hot fan and the speed of the transmission roller at 60 r/min, the potassium-tungsten bronze coating on the upper surface of the glass is prepared after curing. In the test of photothermal conversion and thermal insulation performance of the potassium-tungsten bronze coating on the upper surface of the glass shown in FIG. 16, the glass with a 50 W halogen lamp is irradiated from a distance of 20 cm from the upper surface of the glass. Compared with the quartz glass without thermal insulation coating or with only PVA coating, the glass with thermal insulation coating on the upper surface of the glass made by Example 3 reduces the temperature in the chamber by 7.5° C. The decline reached 10.7 percent. The heat insulation principle of the $K_{0.32}WO_3$ coating prepared by example 3 is that the potassium-tungsten bronze in the coating absorbs near-infrared light and converts it into heat energy outside the box to achieve heat insulation effect. Therefore, the $K_{0.32}WO_3$ coating prepared by Example 3 method has high photothermal conversion performance and heat insulation performance.

The glass with $K_{0.32}WO_3$ coating on the upper surface prepared by Example 3 is turned over so that the thermal insulation coating on the upper surface of the glass can also be used to heat the interior of the cabinet after the $K_{0.32}WO_3$ coating has high photothermal conversion and thermal insulation properties. Thermal management can be performed effectively by adjusting the relative position of the thermal insulation coating prepared in Example 3.

Example 4 Preparation of Sodium Tungsten Bronze $Na_{0.33}WO_3$

As shown in FIG. 1, the method for industrializing preparation of nano-sodium tungsten bronze by hydrolysis of a coordination compound of cation at a lower temperature comprises the following preparation steps:

Step 1. Prepare sodium source solution;
Dosage: Sodium source concentration in sodium source solution is 2 mol/L.
Sodium chloride (NaCl) and deionized water are added to the first mixing vessel; Under normal pressure, the solution was prepared by setting the solution temperature at 25° C., stirring speed at 400 r/min and stirring for 10 min.

Step 2. Prepare tungsten source solution;
Dosage: Tungsten source concentration in tungsten source solution is 0.1 mol/L.
Add 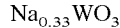 $WCl_6$ and $CH_3CH_2OH$ to the second mixing container; Under normal pressure, the solution was prepared by setting the dissolution temperature at 40° C., stirring speed at 300 r/min and stirring for 50 min.

Step 3. Heat by water-bath and hydrolyze to produce nano alkali tungsten bronze dispersion;
Dosage: 2.32 kg of sodium source solution and 61.5 kg of tungsten source solution are required for preparing 1 kg of sodium-tungsten bronze powder.
One-step low-temperature heating hydrolysis to make dispersion: sodium source solution and tungsten source solution are added to the water bath heating container; Set the temperature of the water bath to 70° C., set the stirring speed of the water bath heating container to 500 r/min, and get the dispersion after stirring for 1440 min.

Step 4. Solid-liquid separation;
In Example 4, the lotion is $CH_3OH$.
Step 41. Add the dispersion liquid to the solid-liquid separator and let it stand for 20 min to obtain the first precipitate and the first supernatant. And the first supernatant is discharged;
Step 42. Add lotion to the solid-liquid separator, which is 4.5 times of the first sediment; The stirring speed of the solid-liquid separator was set to 200 r/min, and the second precipitation and the second supernatant were obtained after stirring for 20 min and standing for 20 min. And the second supernatant is discharged;

Step 43. Add lotion to the solid-liquid separator, which is 4.5 times of the second sediment; The stirring speed of the solid-liquid separator was set to 200 r/min, and the third precipitation and the third supernatant were obtained after stirring for 50 min and standing for 70 min. And the third supernatant is discharged;

Step 47. Add lotion to the solid-liquid separator, the solvent is 5 times of the third precipitate; The stirring speed of the solid-liquid separator is set to 200 r/min. The sodium tungsten bronze dispersion was obtained after stirring for 20 min.

Characteristics and Properties of Sodium-Tungsten Bronze Obtained by Examples 4 Method:

The sodium tungsten bronze dispersion prepared in step four was dried by vacuum resistance furnace at 60° C. and vacuum drying for 480 min to obtain the sodium tungsten bronze powder, namely $Na_{0.33}WO_3$ powder. The industrial yield of $Na_{0.33}WO_3$ powder is as high as 60% by calculating the output of input raw materials and products.

In the XRD pattern shown in FIG. 8, all diffraction peaks of the sodium-tungsten bronze powder obtained by examples 4 method belong to $Na_{0.33}WO_3$, indicating that pure phase sodium-tungsten bronze has been synthesized.

In the SEM spectrum shown in FIG. 9, the $Na_{0.33}WO_3$ powder obtained by the method of example 4 has a short rod-like morphology, and the length of the short rod-like structure is 20~150 nm and the diameter is 20~50 nm.

By UV-VIS-NIR spectrum test, $Na_{0.33}WO_3$ powder obtained by embodim-4 method has excellent near-infrared shielding properties, high visible light transmittance and good Uv shielding properties.

By FTIR spectrogram test, $Na_{0.33}WO_3$ powder obtained by example 4 method has certain middle and far infrared shielding properties.

In the Uv-Vis-NIR spectrum shown in FIG. 15, the $Na_{0.33}WO_3$ powder and PVA composite film prepared by embodims-4 method has higher near-infrared absorption properties, ultraviolet shielding properties and higher visible light transmission properties.

Step 5. Prepare sodium tungsten bronze coating;
Dosage (weight): Sodium tungsten bronze dispersion: PVA: deionized water=1.5:7:120.
Add sodium tungsten bronze dispersion, PVA and deionized water to the third mixing vessel; Set the stirring speed of the third mixing container to 300 r/min; Sodium tungsten bronze coating was obtained after stirring for 100 min.

Step 6. Spray process to make glass curtain wall;
The sodium-tungsten bronze coating is injected into the silo of the spraying machine through a pipe, and the spraying distance between the nozzle and the upper surface of the glass plate is set to H=1 cm; The flow rate of sodium tungsten bronze coating is 2 ml/min.
The heat insulation coating on the upper surface of the glass is prepared after curing at a hot air temperature of 40° C. provided by the hot air fan and a transmission roller speed of 50 r/min.

In order to realize large-size spraying of glass curtain wall, the invention adopts a structure of array nozzle arrangement, as shown in FIG. 7. An array of ultrasonic atomizing nozzle 5C is arranged on the plate 5A of the nozzle mechanism 5. The ultrasonic atomizing nozzle 5C is connected with the silo of the sprayer through a flexible catheter. The center of the plate 5A is provided with a column 5B, which is fixed with the shell of the sprayer.

In the invention, the ultrasonic atomizing nozzle 5C has a nozzle diameter of 20 mm and a nozzle diameter of 1.5 mm. The number of ultrasonic atomizing nozzles 5C set on the plate 5A is determined according to the size of the glass curtain wall made and the diameter of the nozzle and the diameter of the nozzle.

In the test of photothermal conversion and thermal insulation performance of the sodium-tungsten bronze coating on the upper surface of the glass shown in FIG. 16, a 50 W halogen lamp is used to illuminate the glass from a distance of 20 cm from the upper surface of the glass. Compared with quartz glass without thermal insulation coating or with only PVA coating, the glass with thermal insulation coating on the upper surface of the glass prepared in Example 4 reduces the temperature in the chamber by 10° C. The decline reached 14.3 percent. The heat insulation principle of the $Na_{0.33}WO_3$ coating prepared in Example 4 is that the sodium tungsten bronze in the coating absorbs near-infrared light and converts it into heat energy outside the box to achieve heat insulation effect. Therefore, the $Na_{0.33}WO_3$ coating prepared by Example 4 method d has high photothermal conversion and heat insulation properties.

The glass with $Na_{0.33}WO_3$ coating on the upper surface prepared in Example 4 is turned over so that the thermal insulation coating on the upper surface of the glass can also be used to heat the interior of the cabinet after the $Na_{0.33}WO_3$ coating has high photothermal conversion and thermal insulation properties. Thermal management can be performed effectively by adjusting the relative position of the thermal insulation coating prepared in Example 4.

Example 5 Preparation of Cesium Tungsten Bronze $Cs_{0.23}WO_3$

As shown in FIG. 2, the nano-cesium tungsten bronze prepared by hydrolysis of a coordination compound of cation at a lower temperature industrialization and the nano-cesium tungsten bronze coating made by spraying process are composed of the following preparation steps:

Step 1. Prepare the cesium source solution;
Dosage: The concentration of cesium source in cesium source solution is 0.2 mol/L.
Add CsOH and deionized water to the first mixing container; Under normal pressure, the solution of cesium source was prepared after the solution temperature was set at 40° C., the stirring speed was 400 r/min and the stirring speed was 20 min.

Step 2. Prepare tungsten source solution;
Dosage: Tungsten source concentration in tungsten source solution is 0.15 mol/L.
Add $WCl_6$ and $CH_3(CH_2)_2OH$ to the second mixing container; Under normal pressure, the solution was prepared by setting the dissolution temperature at 30° C., stirring speed at 500 r/min and stirring for 20 min.

Step 3. Heat by water-bath and hydrolyze to produce nano alkali tungsten bronze dispersion;
Dosage: 6.5 kg of cesium source solution and 36.32 kg of tungsten source solution are required to prepare 1 kg of cesium tungsten bronze powder.
One-step low temperature heating hydrolysis to make dispersion liquid: cesium source solution and tungsten source solution are added to the water bath heating container; Set the temperature of the water bath to 80° C., set the stirring speed of the water bath heating container to 500 r/min, and get the dispersion after stirring for 360 min.

Step 4. Solid-liquid separation;
In Example 5, the lotion is $CH_3CH_2OH$.

Step 41. Add the dispersion liquid to the solid-liquid separator and let it stand for 100 min to obtain the first precipitate and the first supernatant; And the first supernatant is discharged;

Step 42. Add lotion to the solid-liquid separator, which is 3.5 times of the first sediment; The stirring speed of the solid-liquid separator was set to 400 r/min, and the second precipitation and the second supernatant were obtained after stirring for 30 min and standing for 40 min. And the second supernatant is discharged;

Step 43. Add lotion to the solid-liquid separator, which is 3.5 times of the second sediment; The stirring speed of the solid-liquid separator was set to 400 r/min, and the third precipitation and the third supernatant were obtained after stirring for 80 min and standing for 70 min. And the third supernatant is discharged;

Step 47. Add deionized water to the solid-liquid separator, and the solvent is 4 times of the third precipitate; The stirring speed of the solid-liquid separator is set to 500 r/min. Cesium tungsten bronze dispersion was obtained after stirring for 50 min.

Step 5. Prepare cesium tungsten bronze coating;
Dosage (weight): cesium tungsten bronze dispersion: PVA: deionized water=1:5:100.

Cesium tungsten bronze dispersion, PVA and deionized water were added to the third mixing vessel. Set the stirring speed of the third mixing container to 400 r/min; Cesium tungsten bronze coating was obtained after stirring for 90 min.

Step 6. Spray process to make glass curtain wall;
The cesium tungsten bronze coating is injected into the bin of the spraying machine through a pipe, and the spraying distance between the nozzle and the upper surface of the glass plate is set to H=1 cm; The flow rate of cesium tungsten bronze coating is 7 ml/min.

The heat insulation coating on the upper surface of the glass is prepared after curing at a hot air temperature of 35° C. provided by the hot air fan and at a transmission roller speed of 20 r/min.

In order to realize large-size spraying of glass curtain wall, the invention adopts a structure of array nozzle arrangement, as shown in FIG. 7. An array of ultrasonic atomizing nozzle 5C is arranged on the plate 5A of the nozzle mechanism 5. The ultrasonic atomizing nozzle 5C is connected with the silo of the sprayer through a flexible catheter. The center of the plate 5A is provided with a column 5B, which is fixed with the shell of the sprayer.

In the invention, the ultrasonic atomizing nozzle 5C has a nozzle diameter of 10 mm and a nozzle diameter of 1 mm. The number of ultrasonic atomizing nozzles 5C set on the plate 5A is determined according to the size of the glass curtain wall made and the diameter of the nozzle and the diameter of the nozzle.

Characteristics and Properties of Cesium Tungsten Bronze Obtained by Examples 5 Method By XRD pattern analysis, all the diffraction peaks of the cesium tungsten bronze powder obtained by example 5 method belong to $Cs_{0.23}WO_3$, indicating that pure phase cesium tungsten bronze has been synthesized.

By SEM spectrum analysis, the $Cs_{0.23}WO_3$ powder obtained by example 5 method has a short rod-like morphology, and the length of the short rod-like structure is 30~140 nm and the diameter is 15~40 nm.

By Uv-Vis-NIR spectrum analysis, the $Cs_{0.23}WO_3$ powder obtained by embodims-5 method has higher near-infrared absorption properties, ultraviolet shielding properties and visible light transmission properties.

By testing the photothermal conversion and thermal insulation properties of the thermal insulation coating on the upper surface of the glass, the thermal insulation coating prepared in example 5 has high photothermal conversion and thermal insulation properties.

Example 6 Preparation of Sodium Tungsten Bronze $Na_{0.30}WO_3$

The invention adopts hydrolysis method combined with coprecipitate method to synthesize sodium tungsten bronze alkoxide precursor and synthesizes sodium tungsten bronze at low temperature in the stock liquid phase, which comprises the following preparation steps:

As shown in FIG. 2, the nano-sodium-tungsten bronze prepared industrially by applying the low-temperature cationic coordination tungsten brine hydrolysis, and the nano-sodium-tungsten bronze coating made by spraying process include the following preparation steps:

Step 1. Prepare sodium source solution;
Dosage: Sodium source concentration in sodium source solution is 2 mol/L.

NaCl and deionized water were added to the first mixing vessel. Under normal pressure, the solution was prepared by setting the dissolution temperature at 40° C., stirring speed at 300 r/min and stirring for 15 min.

Step 2. Prepare tungsten source solution;
Dosage: Tungsten source concentration in tungsten source solution is 0.075 mol/L.

Add $WCl_6$ and $CH_3CH_2OH$ to the second mixing container; Under normal pressure, the solution of tungsten source was prepared after the solution temperature was set at 35° C., the stirring speed was 400 r/min and the stirring speed was 25 min.

Step 3. Heat by water-bath and hydrolyze to produce nano alkali tungsten bronze dispersion;
Dosage: 2.2 kg sodium source solution and 55.42 kg tungsten source solution are required to prepare 1 kg cesium tungsten bronze powder.

One-step low-temperature heating hydrolysis to make dispersion: sodium source solution and tungsten source solution are added to the water bath heating container; Set the temperature of the water bath to 74° C., set the stirring speed of the water bath heating container to 400 r/min, and get the dispersion after stirring for 1500 min.

Step 4. Solid-liquid separation;
In Example 6, the lotion is $CH_3CH_2OH$.

Step 41. Add dispersion liquid to the solid-liquid separator and let it stand for 30 min to obtain the first precipitate and the first supernatant; And the first supernatant is discharged;

Step 42. Add lotion to the solid-liquid separator, which is twice as large as the first precipitate; The stirring speed of the solid-liquid separator was set to 500 r/min, and the second precipitation and the second supernatant were obtained after stirring for 40 min and standing for 40 min. And the second supernatant is discharged;

Step 43. Add lotion to the solid-liquid separator, which is twice as much as the second precipitate; The stirring speed of the solid-liquid separator was set to 400 r/min, and the third precipitation and the third supernatant were obtained after stirring for 50 min and standing for 50 min. And the third supernatant is discharged;

Step 47. Add deionized water to the solid-liquid separator, and the solvent is 3 times of the third precipitate; The stirring speed of the solid-liquid separator is set to 300/min. The sodium tungsten bronze dispersion was obtained after stirring for 60 min.

Dry Preparation of Sodium Tungsten Bronze Powder

The sodium tungsten bronze dispersion prepared in step four was dried by vacuum resistance furnace at 70° C. and vacuum drying for 300 min to obtain sodium tungsten bronze powder, namely $Na_{0.30}WO_3$ powder. The industrial yield of $Na_{0.30}WO_3$ powder is 65% by calculating the output of input raw materials and products.

Step 5. Prepare sodium tungsten bronze coating;

Dosage (weight): Sodium tungsten bronze dispersion: PVA: deionized water=1.5:7:120.

Add sodium tungsten bronze dispersion, PVA and deionized water to the third mixing vessel; Set the stirring speed of the third mixing container to 300 r/min; Sodium tungsten bronze coating was obtained after stirring for 100 min.

Step 6. Spray process to make glass curtain wall;

The sodium-tungsten bronze coating is injected into the silo of the spraying machine through a pipe, and the spraying distance between the nozzle and the upper surface of the glass plate is set to H=1.5 cm; The flow rate of sodium tungsten bronze coating is 1 ml/min.

The heat insulation coating on the upper surface of the glass is prepared after curing at a hot air temperature of 40° C. provided by the hot air fan and a transmission roller speed of 50 r/min.

In order to realize large-size spraying of glass curtain wall, the invention adopts a structure of array nozzle arrangement, as shown in FIG. 7. An array of ultrasonic atomizing nozzle 5C is arranged on the plate 5A of the nozzle mechanism 5. The ultrasonic atomizing nozzle 5C is connected with the silo of the sprayer through a flexible catheter. The center of the plate 5A is provided with a column 5B, which is fixed with the shell of the sprayer.

In the invention, the ultrasonic atomizing nozzle 5C has a nozzle diameter of 20 mm and a nozzle diameter of 1.5 mm. The number of ultrasonic atomizing nozzles 5C set on the plate 5A is determined according to the size of the glass curtain wall made and the diameter of the nozzle and the diameter of the nozzle.

Characteristics and Properties of Sodium-Tungsten Bronze Obtained by Examples 6 Method By XRD pattern analysis, all the diffraction peaks of the sodium tungsten bronze powder obtained by the 6-way method in example are $Na_{0.30}WO_3$, indicating that the pure phase sodium tungsten bronze is synthesized.

By SEM atlas analysis, the $Na_{0.30}WO_3$ powder obtained by the example 6 method has a short rod-like morphology, and the length of the short rod-like structure is 30~140 nm and the diameter is 15~40 nm.

By Uv-Vis-NIR spectrum analysis, $Na_{0.30}WO_3$ powder obtained by the example 6 method has higher near-infrared absorption properties, ultraviolet shielding properties and visible light transmission properties. By testing the photothermal conversion and thermal insulation properties of the thermal insulation coating on the upper surface of the glass, the thermal insulation coating prepared in example 6 has high photothermal conversion and thermal insulation properties.

The above is only the preferred example of the invention, and it should be noted that for ordinary technicians in the technical field, several improvements and refinements can be made without deviating from the principle of the invention, and these improvements and refinements shall also be considered as the scope of protection of the invention.

The invention claimed is:

1. A method for the industrial preparation of nano alkali metal tungsten bronze by hydrolysis of a coordination compound of a cation, comprising:
    preparing an alkali metal source solution including:
        adding deionized water to a first mixing container,
        arranging a stirrer inside the first mixing container,
        arranging an alkali metal source inlet, a deionized water inlet and an exhaust outlet above a cylinder block of the first mixing container,
        providing a discharge port for the alkali metal source solution below the cylinder block, and
        adding an alkali metal source to the first mixing container,
        wherein the alkali metal source includes one or two combinations of alkali metal ion salts corresponding to hydroxides, chloride salts, nitrates, sulfates and carbonates,
        wherein the hydroxides are cesium hydroxide, potassium hydroxide or sodium hydroxide, the chloride salts are cesium chloride, rubidium chloride, potassium chloride or sodium chloride, the nitrates are cesium nitrate, potassium nitrate or sodium nitrate, the sulfates are cesium sulfate, potassium sulfate or sodium sulfate, the carbonates are cesium carbonate, potassium carbonate or sodium carbonate;
    setting, under normal pressure, a dissolution temperature to 10° C.-40° C. and a stirring speed to 200 r/min-600 r/min, wherein the alkali metal source solution is prepared after stirring for 1 min-15 min, and a concentration of alkali metal ions in the alkali metal source solution is 0.02 mol/L-10 mol/L;
    preparing a tungsten source solution including:
        adding a tungsten source to a second mixing container, wherein the tungsten source is tungsten hexachloride or tungsten tetrachloride,
        providing the second mixing container with an internal agitator,
        arranging a tungsten source feed port, an alcohol source feed port and an exhaust port above a cylinder block of the second mixing container,
        providing a discharge port for the tungsten source solution under the cylinder block of the second mixing container wherein a resistance wire is placed between an outer wall of an inner shell of the second mixing container and an inner wall of the cylinder block of the second mixing container,
        adding an alcohol solution to the second mixing container,
    wherein the alcohol solution is one, two or a combination of methanol, ethanol, n-propyl alcohol, isopropyl alcohol and n-butanol, and
        setting, under normal pressure, a dissolution temperature to 10° C.-40° C. and a stirring speed to 200r/min-600r/min, wherein the tungsten source solution is prepared after stirring for 10 min-60 min, and the concentration of tungsten in the prepared tungsten source solution is 0.02 mol/L-1 mol/L;
    heating by water-bath and hydrolyzing to produce a nano alkali metal tungsten bronze dispersion including:
        preparing 1 kg of nanometer alkali metal tungsten bronze powder with 0.18 kg-90 kg of alkali metal source solution and 3.68 kg-184 kg of tungsten source solution, and
        adding alkali metal source solution, tungsten source solution and deionized water to a water bath heating container having a water bath temperature of 40-95° C., with a stirring speed of 200r/min-1000r/min, and obtaining the nano alkali metal tungsten bronze dispersion after stirring for 90 min-2880 min,
wherein the water bath heating container comprises a CA feed port, a CB feed port, a CC feed port, and exhaust port and is divided into a heating cylinder comprising a stirrer and a water bath comprising tap water, and a heating coil is arranged between the heating cylinder and the water bath,
performing a solid-liquid separation including:
adding the nano alkali metal tungsten bronze dispersion to a solid-liquid separator comprising a stirrer and allowing it to stand for 20-100 min to obtain a first precipitate and a first supernatant, and discharging the first supernatant,
adding a washing liquor to the solid-liquid separator including the first precipitate and a stirring speed of the solid-liquid separator is set to 200r/min-600r/min, and a second precipitate and a second supernatant were obtained after stirring for 10 min-60 min and standing for 20-100 min, and discharging the second supernatant,
adding a washing liquor to the solid-liquid separator including the second precipitate and a stirring speed of the solid-liquid separator is set to be 200r/min-600r/min, and a third precipitate and a third supernatant were obtained after stirring for 10 min-60 min and standing for 20-100 min, and discharging the third supernatant,
adding a washing liquor to the solid-liquid separator including the third precipitate and a stirring speed of the solid-liquid separator is set to 200r/min-600r/min, and
obtaining a final nano alkali metal tungsten bronze dispersion after stirring for 10 min-60 min,
wherein the solid-liquid separator comprises a cylinder block, the cylinder block of the solid-liquid separator is provided with a DA feed port, a DB feed port and a DA discharge port and a DB discharge port is arranged under the cylinder block,
wherein the washing liquor is selected from methanol, ethanol, acetone, deionized water, and combinations thereof, and
wherein, the nano alkali metal tungsten bronze has a composition of $Cs_xWO_3$, $Rb_xWO_3$, $K_xWO_3$ or $Na_xWO_3$, in which X=0.2-0.33.

2. The method in accordance with claim 1, further comprising preparing a dry nano alkali metal tungsten bronze powder by drying the final nano alkali metal tungsten bronze dispersion with a vacuum resistance furnace, wherein a vacuum degree is $1\times10^{-2}$ Pa-$1\times10^{-4}$ Pa, a drying temperature is 50° C.-100° C., and a drying time is 180 min-720 min.

3. The method in accordance with claim 2, wherein the nano alkali metal tungsten bronze powder is $Cs_{0.30}WO_3$ powder, $Rb_{0.28}WO_3$ powder, $K_{0.32}WO_3$ powder or $Na_{0.33}WO_3$ powder.

4. The method in accordance with claim 2, wherein the prepared nano alkali metal tungsten bronze powder has a short rod-like shape or isometric shape, wherein a length of the short rod-like structure is 10-150 nm, a diameter is 10-50 nm, and dimensions of the isometric shape structure are less than 100 nm in each direction.

5. The method in accordance with claim 2, wherein an industrial yield of nanometer cesium tungsten bronze powder is 70%-85%, an industrial yield of nanometer rubidium tungsten bronze powder is 70%-85%, an industrial yield of nanometer potassium tungsten bronze powder is 60%-80%, and an industrial yield of nanometer sodium tungsten bronze powder is 50%-75%.

6. The method in accordance with claim 1, further comprising:
preparing an alkali metal tungsten bronze coating by adding the final nano alkali metal tungsten bronze dispersion, PVA, and deionized water with a dosage of 1:2-15:80-130 to a third mixing container, setting a stirring speed of the third mixing container to 100r/min-400r/min for 30 min. to about 120 min;
injecting the alkali metal tungsten bronze coating into a silo of a spraying machine through a pipeline, spraying the alkali metal tungsten bronze coating with a spraying distance between a nozzle and an upper surface of a glass plate being 0.5-2 cm, and a flow rate alkali metal tungsten bronze coating is 1-7 ml/min;
drying the alkali metal tungsten bronze coating with a hot air temperature of 22° C.-40° C. by a hot fan and with a transmission roller speed of 10r/min-60r/min; and
curing the alkali metal tungsten bronze coating on the upper surface of the glass plate.

7. The method according to claim 6, wherein the alkali metal tungsten bronze coating is applied to glass curtain wall.

8. The method according to claim 1, wherein:
in the preparing the alkali metal source solution,
the alkali metal source solution has a concentration of alkali metal ions of 0.05 mol/L-5 mol/L,
in the preparing a tungsten source solution
the dissolution temperature is set to 15° C.-40° C., and the concentration of tungsten in the prepared tungsten source solution is 0.05 mol/L-1 mol/L,
in the heating by water-bath and hydrolyzing to produce a nano alkali metal tungsten bronze dispersion, 1 kg of nanometer alkali metal tungsten bronze powder is prepared with 0.23 kg-36 kg of the alkali metal source solution and 3.68 kg-123 kg of the tungsten source solution, and
the water bath heating container has a water bath temperature set to 40° C.-90° C.

* * * * *